United States Patent
Yang et al.

(10) Patent No.: US 8,838,857 B2
(45) Date of Patent: Sep. 16, 2014

(54) MOBILE DEVICE AND COMPUTATIONAL SYSTEM INCLUDING SAME

(75) Inventors: Seung-soo Yang, Hwaseong-si (KR); Kwang-ho Kim, Hwaseong-si (KR); Yong-suk Kim, Daejeon (KR); Taek-kyun Shin, Gwangmyeong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 94 days.

(21) Appl. No.: 13/310,904

(22) Filed: Dec. 5, 2011

(65) Prior Publication Data

US 2012/0144076 A1    Jun. 7, 2012

Related U.S. Application Data

(60) Provisional application No. 61/419,271, filed on Dec. 3, 2010.

(30) Foreign Application Priority Data

Mar. 3, 2011    (KR) .......................... 10-2011-0019096

(51) Int. Cl.
| | |
|---|---|
| G06F 13/12 | (2006.01) |
| G06F 13/38 | (2006.01) |
| H04M 1/725 | (2006.01) |
| G06F 3/0354 | (2013.01) |
| G06F 3/0346 | (2013.01) |

(52) U.S. Cl.
CPC ........... *G06F 3/0346* (2013.01); *H04M 1/7253* (2013.01); *G06F 3/03547* (2013.01); *H04M 2250/22* (2013.01)
USPC ............................................... 710/63; 463/37

(58) Field of Classification Search
None
See application file for complete search history.

(56) References Cited

U.S. PATENT DOCUMENTS

| | | | |
|---|---|---|---|
| 2007/0265076 A1* | 11/2007 | Lin et al. .......................... | 463/36 |
| 2009/0207138 A1* | 8/2009 | Thorn ............................ | 345/173 |
| 2009/0313434 A1* | 12/2009 | Poo et al. ...................... | 711/115 |
| 2010/0171692 A1* | 7/2010 | Chang et al. ................... | 345/156 |
| 2010/0201615 A1* | 8/2010 | Tupman et al. ................ | 345/156 |
| 2010/0265179 A1* | 10/2010 | Ram ............................ | 345/163 |
| 2012/0154292 A1* | 6/2012 | Zhao et al. ..................... | 345/173 |

* cited by examiner

*Primary Examiner* — Elias Mamo
(74) *Attorney, Agent, or Firm* — Volentine & Whitt, PLLC

(57) ABSTRACT

A mobile device and a computational system including same are described. The mobile device includes a sensor unit having a motion sensor and/or a touch sensor that provides sensing information. The sensing information is applied to a universal serial bus user interface (USB UI) data generation unit and is changed into USB UI data before being output as USB UI data using a USB communication technique.

8 Claims, 40 Drawing Sheets

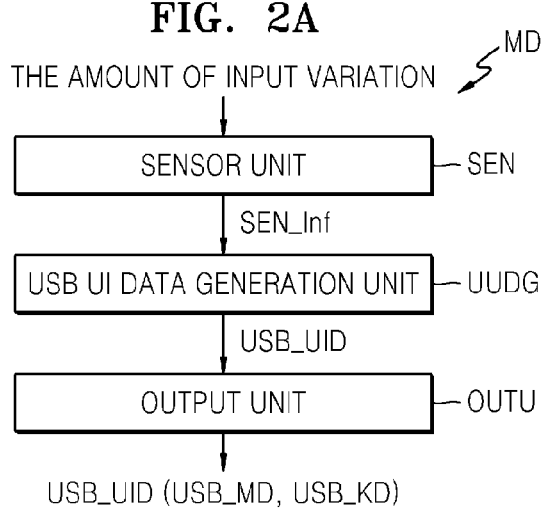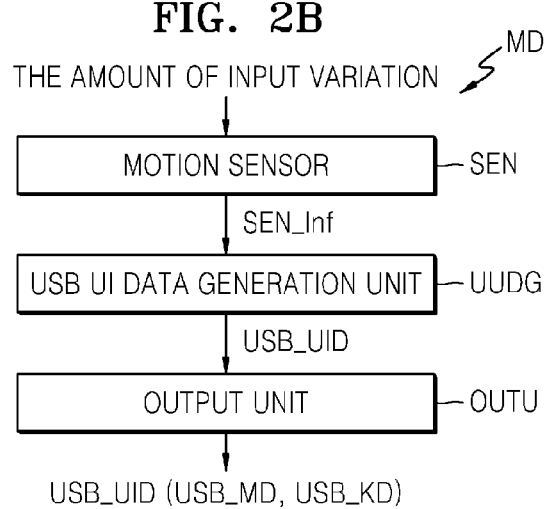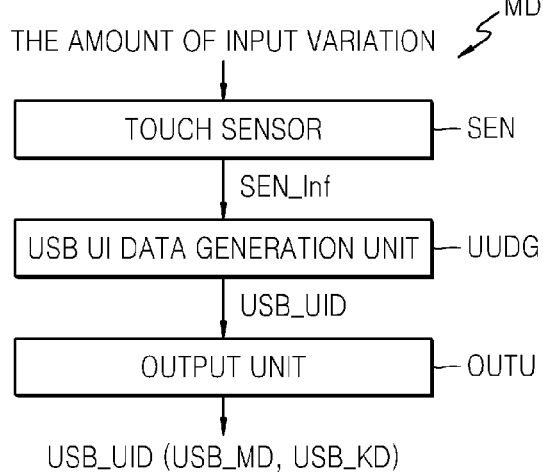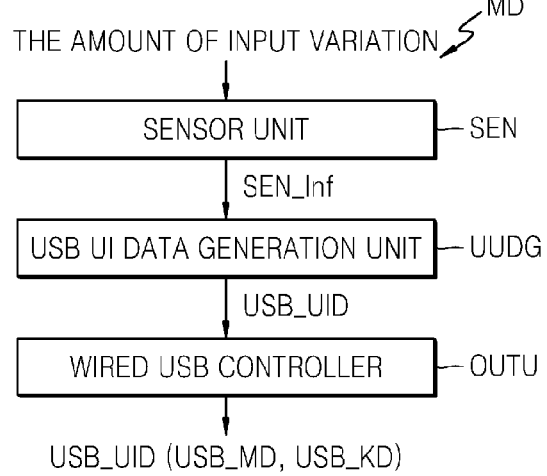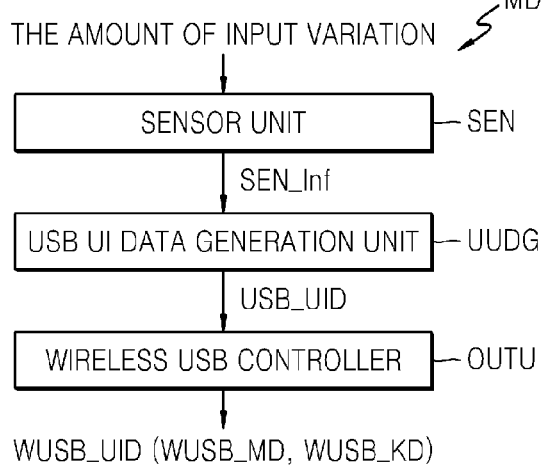

FIG. 5A
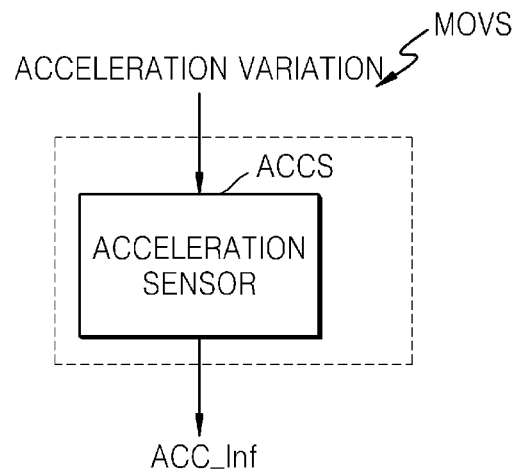
FIG. 5B
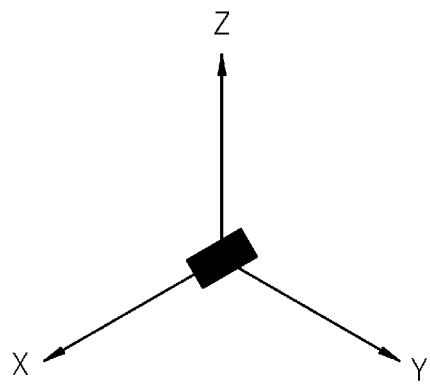
FIG. 5C
ACCELERATION VARIATION
| ACCELERATION IN CHANGED X AXIS DIRETION | ACCELERATION IN CHANGED Y AXIS DIRETION | ACCELERATION IN CHANGED Z AXIS DIRETION |
|---|---|---|

FIG. 6A
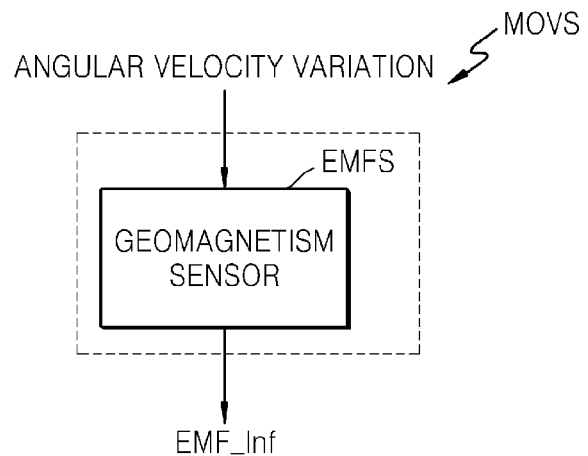
FIG. 6B
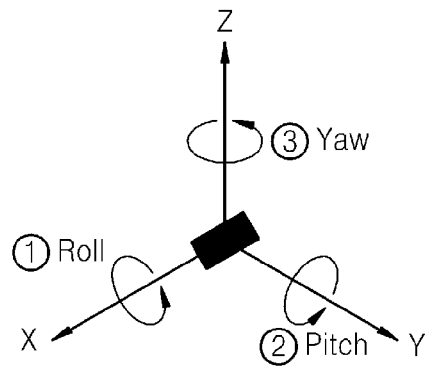
FIG. 6C
ANGULAR VELOCITY VARIATION
| ANGULAR VELOCITY IN CHANGED PITCH DIRETION | ANGULAR VELOCITY IN CHANGED ROLL DIRETION | ANGULAR VELOCITY IN CHANGED YAW DIRETION |
| --- | --- | --- |

FIG. 8A
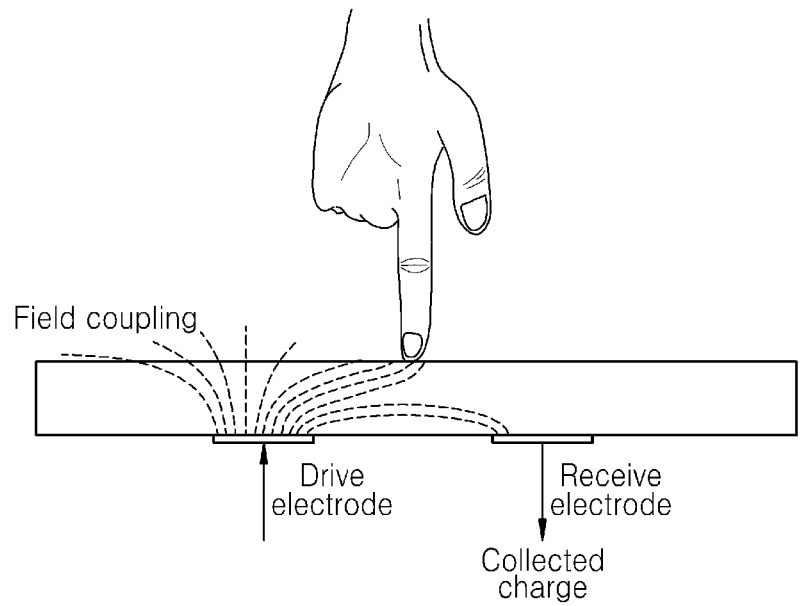
FIG. 8B
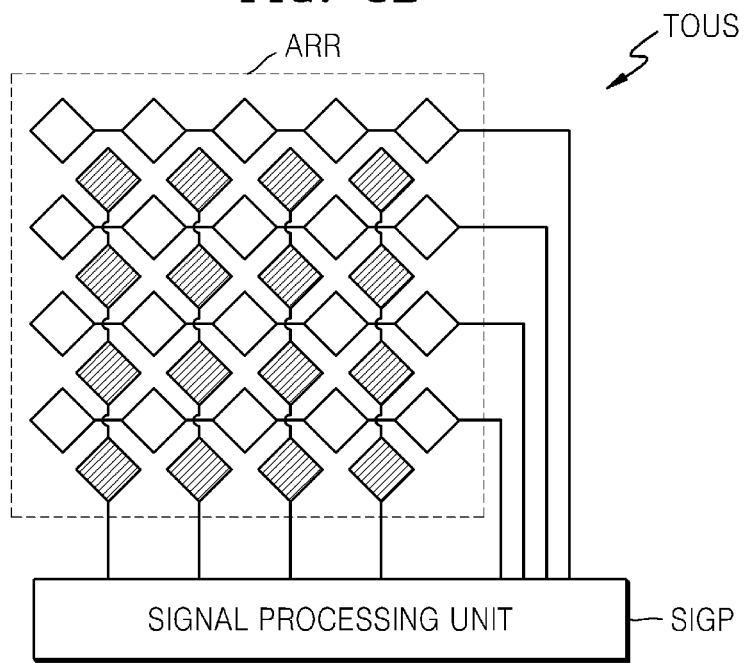
FIG. 8C
TOUCH COORDINATES
| TOUCHED X COORDINATE VALUE | TOUCHED Y COORDINATE VALUE |

FIG. 13A

USB MOUSE DATA

| CHANGED MOUSE BUTTON VALUE | CHANGED MOUSE X AXIS COORDINATE VALUE | CHANGED MOUSE Y AXIS COORDINATE VALUE | CHANGED MOUSE WHEEL VALUE |
|---|---|---|---|

FIG. 13B

USB KEYBOARD DATA

| CHANGED LEFT SPECIFIC KEY VALUE | CHANGED RIGHT SPECIFIC KEY VALUE |
|---|---|

FIG. 13C

| CHANGED KEY VALUE BUFFER 1 | CHANGED KEY VALUE BUFFER 2 | CHANGED KEY VALUE BUFFER 3 |
|---|---|---|
| CHANGED KEY VALUE BUFFER 4 | CHANGED KEY VALUE BUFFER 5 | CHANGED KEY VALUE BUFFER 6 |

FIG. 14

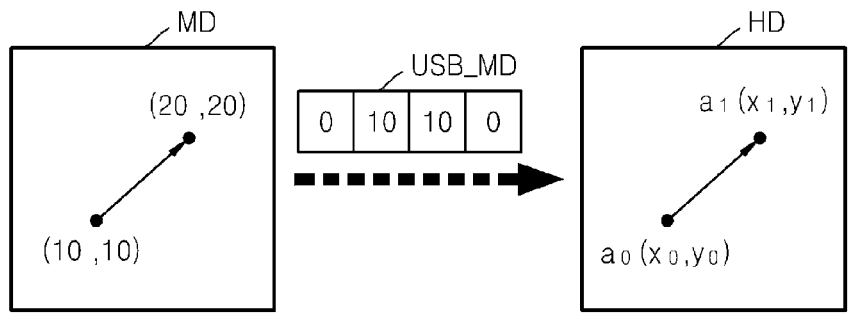

| Transfer | Interrupt | ADDR | ENDP | HID | Buttons |
|---|---|---|---|---|---|
| 15 | IN | 1 | 1 | MOUSE | 0×00 |

| XMOVE | YMOVE | Wheel |
|---|---|---|
| 1 | 0 | 0 |

FIG. 19A
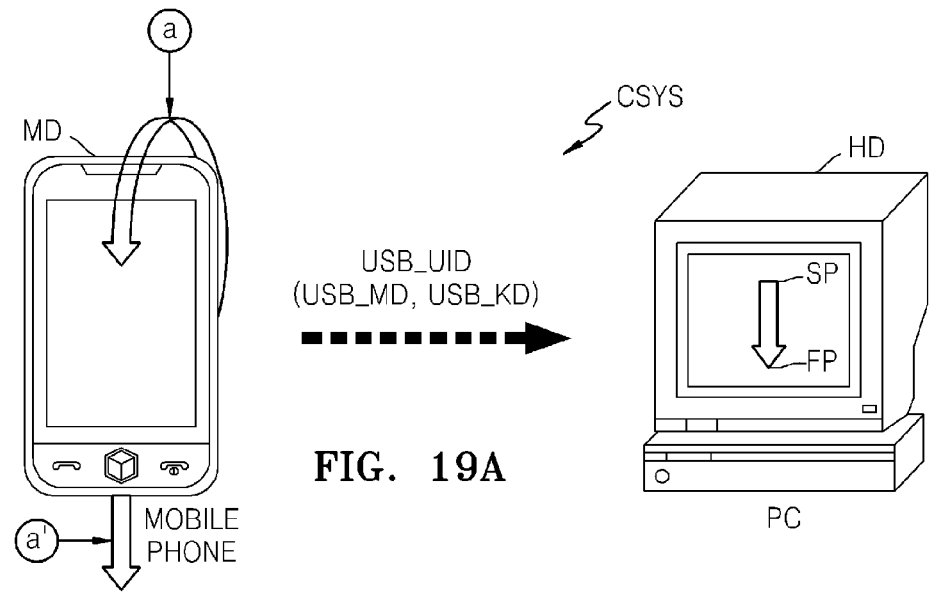
FIG. 19A
FIG. 19B
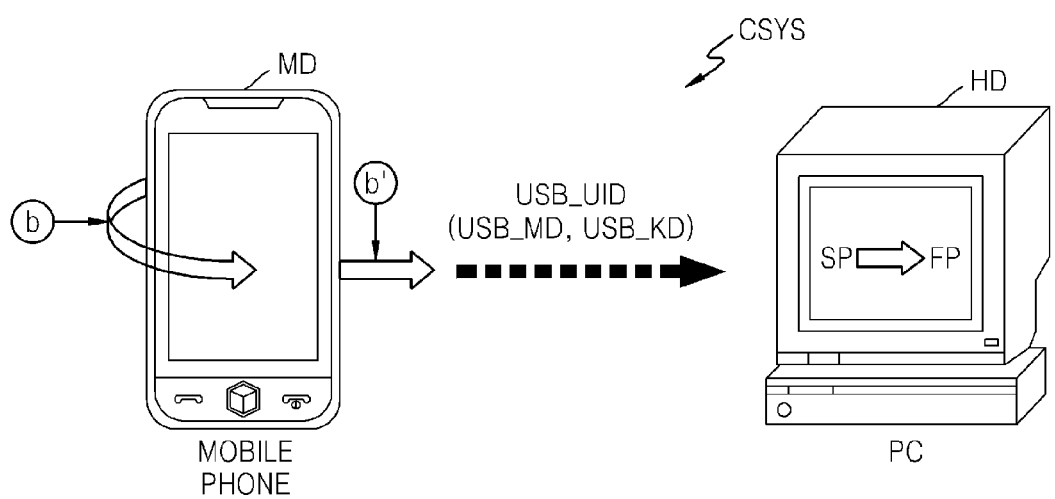

MOBILE DEVICE AND COMPUTATIONAL SYSTEM INCLUDING SAME

CROSS-REFERENCE TO RELATED APPLICATIONS

This application claims the benefit of U.S. Provisional Application No. 61/419,271 filed Dec. 3, 2010, and Korean Patent Application No. 10-2011-0019096 filed Mar. 3, 2011, the collective subject matter of which is hereby incorporated by reference.

BACKGROUND

The inventive concept relates to mobile devices and computational systems including same. More particularly, the inventive concept relates to mobile devices providing a user interface via a universal serial bus (USB) host and a computational system including such mobile devices.

A user interface to a host device may be provided through an input/output (I/O) device connected to the host in a wired and/or wireless manner. However, most host devices include separately provided user interface device(s) and this raises issues of cost and operating efficiency.

SUMMARY OF THE INVENTION

Embodiments of the inventive concept provide mobile devices providing a user interface for a host device, and computational systems including such mobile devices.

According to an aspect of the inventive concept, there is provided a mobile device including; a sensor unit including at least one of a motion sensor and a touch sensor, wherein the motion sensor generates motion information indicating motion variation of the mobile device, the touch sensor generates touch information indicating coordinates touched in a touch screen of the mobile device, and the sensor unit outputs at least one of the motion information and the touch information as sensing information, a universal serial bus user interface (USB UI) data generation unit that changes the sensing information into USB UI data, and an output unit that outputs the USB UI data via a USB communication technique.

According to another aspect of the inventive concept, there is provided a computational system including; a mobile device and a host device, wherein the mobile device serves as a user interface with the host device and includes; a sensor unit including at least one of a motion sensor and a touch sensor, wherein the motion sensor generates motion information indicating motion variation of the mobile device, the touch sensor generates touch information indicating coordinates touched in a touch screen of the mobile device, and the sensor unit outputs at least one of the motion information and the touch information as sensing information, a universal serial bus user interface (USB UI) data generation unit that changes the sensing information into USB UI data, and an output unit that outputs the USB UI data via a USB communication technique.

According to another aspect of the inventive concept, there is provided a mobile device including; a sensor unit including at least one of a motion sensor and a touch sensor, wherein the motion sensor generates motion information indicating motion variation for the mobile device and the touch sensor generates touch information indicating coordinates touched in a touch screen of the mobile device, and the sensor unit outputs at least one of the motion information and the touch information as sensing information, a user interface (UI) data generation unit that changes the sensing information into UI data, and an output unit that outputs the UI data using one of a plurality of communication techniques, wherein the UI data generation unit changes the sensing information into the UI data using a corresponding one of the plurality of communication techniques in response to a mode signal.

According to another aspect of the inventive concept, there is provided a computational system comprising; a mobile device configured for selective connection with a host device using a universal serial bus (USB) interface and corresponding USB communication technique, such that the mobile device serves as a user interface for the host device by providing USB interface (USB UI) data, wherein the USB UI data is derived from sensing information generated within the mobile device using at least one of a motion sensor and a touch sensor.

BRIEF DESCRIPTION OF THE DRAWINGS

Exemplary embodiments of the inventive concept will be more clearly understood from the following detailed description taken in conjunction with the accompanying drawings in which:

FIGS. 2A through 2E are block diagrams of various examples of a mobile device of FIGS. 1A and 1B in more detail;

FIGS. 5A through 7 are diagrams illustrating examples of a motion sensor of FIG. 4;

FIGS. 8A through 8C are diagrams illustrating examples of a touch sensor of FIG. 4;

FIGS. 13A, 13B and 13C are diagrams respectively illustrating data structures of universal serial bus (USB) mouse data, USB keyboard data and USB keyboard data;

FIG. 14 is a diagram illustrating an example of an operation of a USB user interface (UI) data generation unit of FIG. 2;

FIGS. 19A through 20 are diagrams illustrating a motion mode operation in the computational system of FIGS. 17A and 17B;

DETAILED DESCRIPTION

The attached drawings for illustrating exemplary embodiments of the inventive concept are referred to in order to gain a sufficient understanding of the inventive concept, the merits thereof, and the objectives accomplished by the implementation of the inventive concept.

Hereinafter, the inventive concept will be described in some additional detail with reference to the attached drawings. Throughout the written description and drawings, like reference numbers and labels are used to denote like or similar elements.

Figure 1A:
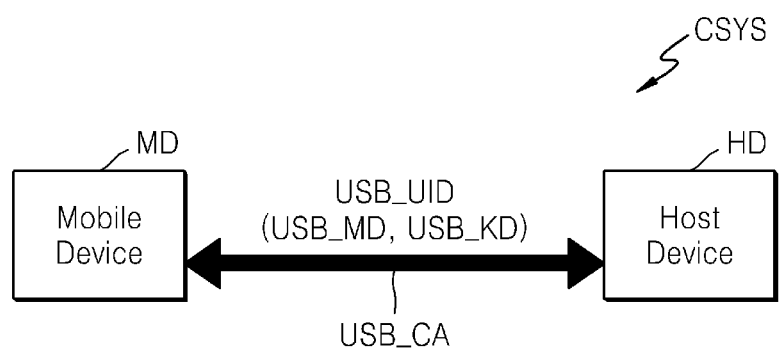
FIGS. 1A and 1B are block diagrams of a computational system according to an embodiment of the inventive concept.
Figure 1B:
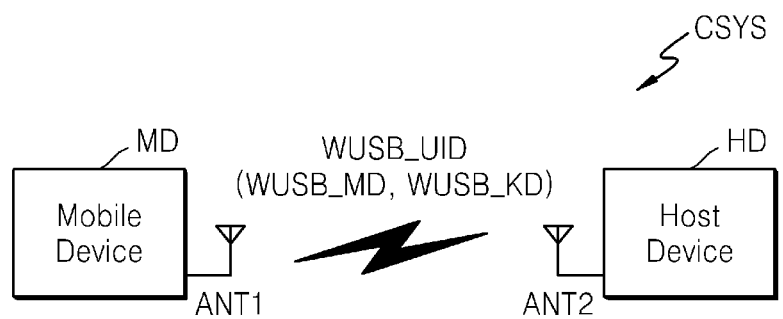

FIGS. 1A and 1B are block diagrams of a computational system CSYS according to embodiments of the inventive concept.

Referring to FIGS. 1A and 1B, the computational system CSYS includes a mobile device MD and a host device HD. The mobile device MD and the host device HD may interface with each other using a universal serial bus (USB) communication technique. FIG. 1A illustrates an example in which the mobile device MD and the host device HD are connected via a USB cable (USB_CA) and interface using a wired USB communication technique. On the other hand, FIG. 1B illustrates an example in which the mobile device MD and the host device HD interface wirelessly using a wireless USB communication technique and respective antennas ANT1 and ANT2.

In particular, the mobile device MD according to an embodiment of the inventive concept may be used as an input device, such as a human interface device (HID), in relation to the host device HD. That is, a mobile device MD according to an embodiment of the inventive concept generates USB user interface (UI) data (USB_UID) which is processed as an input to the host device HD. When necessary in the description that follows, wireless USB UI data (USB UI data) may be differentiated from wired USB UI data (WUSB_UID). Otherwise the reference symbol USB_UID will be understood to indicate wired USB UI data and/or wireless USB UI data.

Possible structures and a corresponding mode of operation for mobile devices MD that operates as input devices for host devices HD will now be explained in some additional detail.

Figure 3:
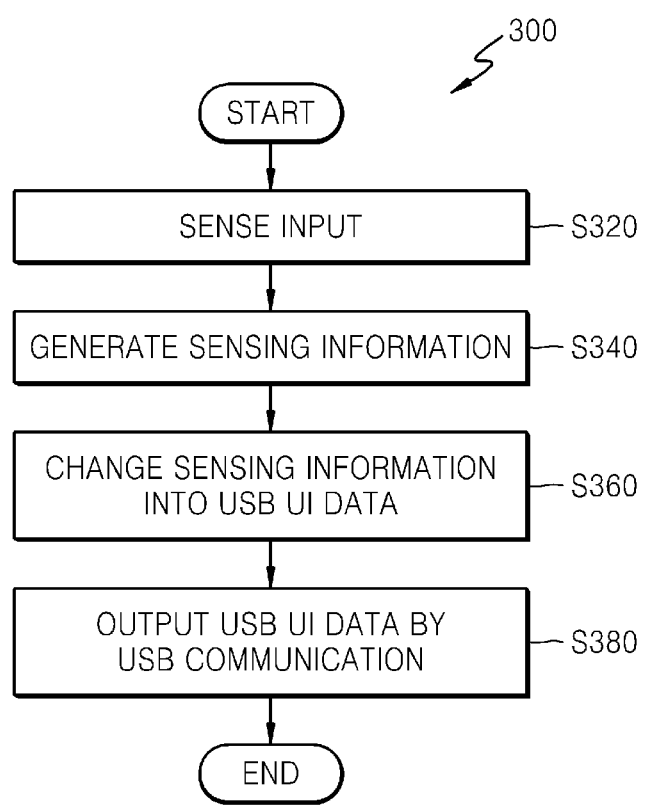
FIG. 3 is a flowchart illustrating an example of a method of operating the mobile devices of FIGS. 2A through 2E.

FIG. 2, collectively and singularly FIGS. 2A through 2E, includes diagrams that further illustrate various examples of the mobile device MD of FIG. 1. FIG. 3 is a flowchart summarizing one possible method of operating the mobile devices MD of FIGS. 2A through 2E.

Referring to FIGS. 2A and 3, the mobile device MD according to an embodiment of the inventive concept, which operates according to an operating method 300 of FIG. 3, includes a sensor unit SEN, a USB UI data generation unit UUDG, and an output unit OUTU. The sensor unit SEN senses a physical variation and/or an electrical variation (i.e., an input) in the mobile device MD (S320) and correspondingly generates sensing information SEN_Inf (S340). For example, the physical variation or the electrical variation of the mobile device MD may be motion variation of the mobile device MD or touch coordinates related to the mobile device MD. Possible physical variation or electrical variation of the mobile device MD will be explained below in some additional detail. The USB UI data generation unit UUDG changes the sensing information SEN-Inf into the USB UI data USB_UID which is processed as an input of the host device HD (S360). Here, the USB UI data USB_UID may be USB mouse data USB_MD which is processed as a mouse input of the host device HD, or USB keyboard data USB_KD which is processed as a keyboard input of the host device HD. The output unit OUTU outputs the USB UI data USB_UID by USB communication (S380). As illustrated in FIG. 1, the output unit OUTU transmits the USB UI data USB_UID to the host device HD by wired or wireless USB communication.

The mobile devices MD of FIGS. 2B through 2E operate similarly to the mobile device MD of FIG. 2A. However, a sensor unit SEN of the mobile device MD of FIG. 2B includes a motion sensor. A sensor unit SEN of the mobile device MD of FIG. 2C includes a touch sensor. Furthermore, an output unit OUTU of the mobile device MD of FIG. 2D includes a wired USB controller. An output unit OUTU of the mobile device MD of FIG. 2E includes a wireless USB controller.

Figure 4:
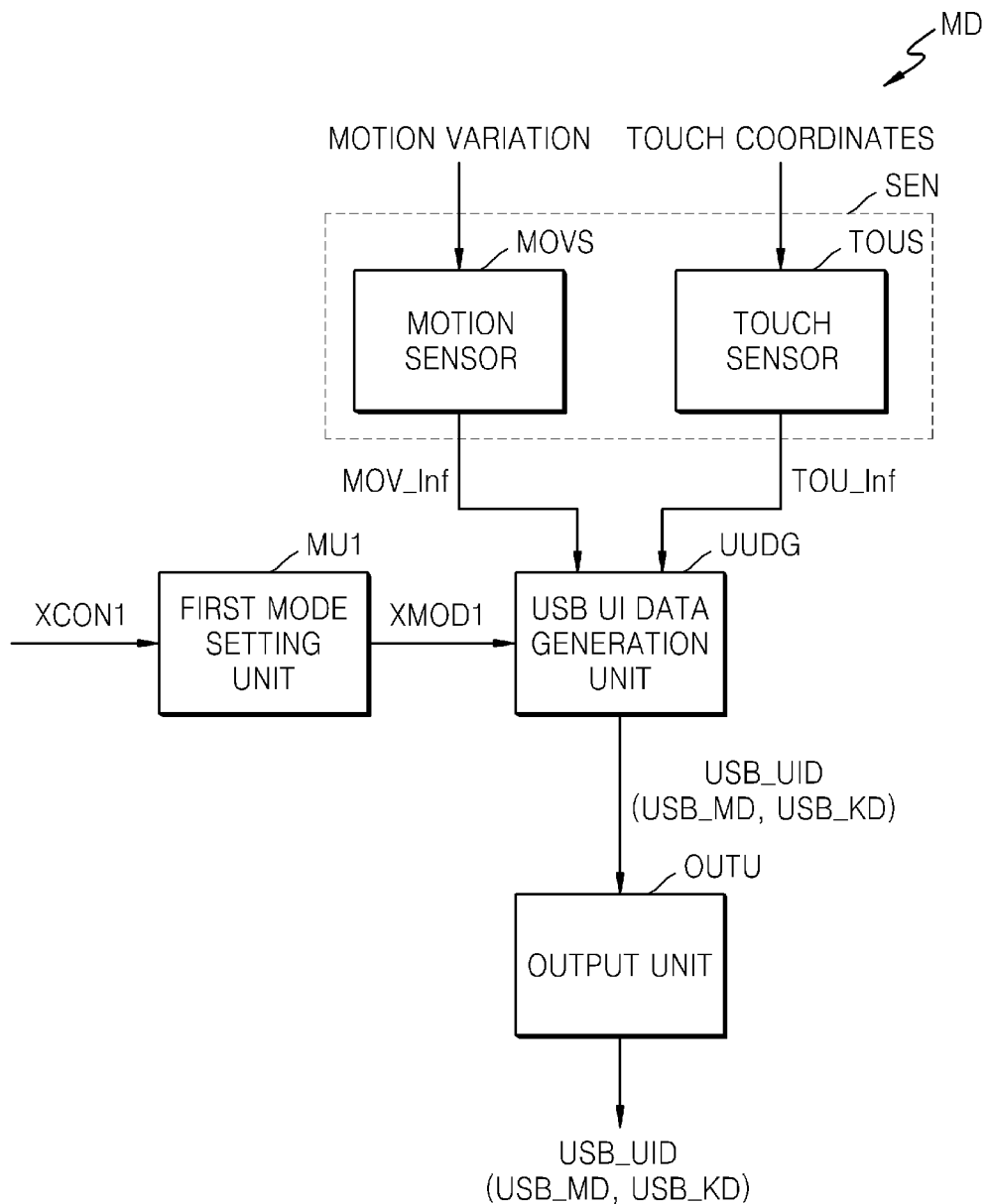
FIG. 4 is a block diagram illustrating another example of the mobile device of FIGS. 1A and 1B.

FIG. 4 is a block diagram further illustrating another possible example of the mobile device MD of FIGS. 1A and 1B.

Referring to FIG. 4, similar to the mobile device MD of FIG. 2, the mobile device MD of FIG. 4 includes the USB UI data generation unit UUDG, the output unit OUTU, and the sensor unit SEN. The USB UI data generation unit UUDG changes the sensing information SEN-Inf into the USB UI data USB_UID. The output unit OUTU receives the USB UI data USB_UID and outputs the USB UI data USB_UID. However, the sensor unit SEN of the mobile device MD of FIG. 4 includes both a motion sensor MOVS and a touch sensor TOUS. The motion sensor MOVS senses motion variation, which is one type of physical variation, of the mobile device MD and outputs the sensed motion variation as motion information MOU_Inf. The touch sensor TOUS senses touched coordinates in a touch screen of the mobile device MD and outputs the sensed touched coordinates as touch information TOU_Inf.

The motion sensor MOVS, as illustrated in FIG. 5A, may be an acceleration sensor ACCS. The acceleration sensor ACCS senses acceleration variation according to the motion of the mobile device MD and outputs acceleration information ACC_Inf. Referring to FIGS. 5B and 5C, the acceleration information ACC_Inf may include the acceleration variation in three axis directions, for example, an X axis direction, a Y axis direction, and a Z axis direction, which is input to the acceleration sensor ACCS.

The motion sensor MOVS, as illustrated in FIG. 6A, may be a geomagnetism sensor EMFS. The geomagnetism sensor EMFS senses angular velocity variation according to a motion of the mobile device MD and outputs angular velocity information EMF_Inf. Referring to FIGS. 6B and 6C, the angular velocity information EMF_Inf may include the angular velocity variation in three axis directions, for example, Roll(①) direction, Pitch(②) direction, and Yaw(③) direction, which is input to the geomagnetism sensor EMFS.

Figure 7:
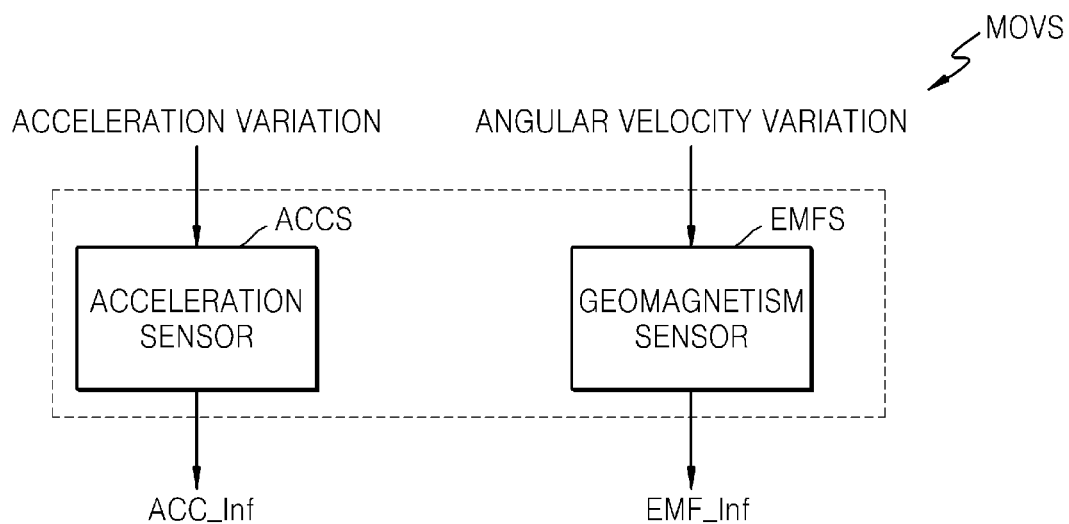

Furthermore, the motion sensor MOVS, as illustrated in FIG. 7, may include the acceleration sensor ACCS and the geomagnetism sensor EMFS. In this case, the USB UI data USB_UID may be generated by corresponding to a part or all of the acceleration information ACC_Inf and the angular velocity information EMF_Inf.

The touch sensor TOUS of the mobile device MD of FIG. 4, as illustrated in FIG. 8A, may perform a sensing operation by a mutual capacitive method in which a predetermined voltage pulse is applied to a drive electrode and charges corresponding to the voltage pulse are collected in a receive electrode. In the case where a finger of a person which touches the touch screen of the mobile device MD is put between the two electrodes, an electric field coupling (indicated by dotted lines) varies. The touch sensor TOUS may sense an electric field coupling variation between the two electrodes and thus sense a point (coordinates) where the finger touches the screen, that is, touch coordinates. The touch sensor TOUS of the mobile device of FIG. 4, as illustrated in FIG. 8B, may include an array ARR of sensing units operating as the drive electrode or the receive electrode of FIG. 8A, and a signal processing unit SIGP for sensing a capacitance variation of the sensing units when a touch occurs and for outputting a result of the sensing as the touch information TOU_Inf.

Referring to FIG. 8C, the coordinates input to the touch sensor TOUS may include a first axis value and a second axis value, which indicate a point touched in a touch active region of the touch screen of the mobile device MD. The first axis value and the second axis value may be an X axis value and a Y axis value for a touched point in the touch active region.

Above, the sensor unit according to certain embodiments of the inventive concept includes at least one of an acceleration sensor, a geomagnetism sensor, and a touch sensor. However, the inventive concept is not limited to only these approaches. The sensor unit according to an embodiment of the inventive concept may generate sensing information corresponding to a variation of the mobile device by using a temperature sensor, a humidity sensor, an ultrasonic sensor, an infrared sensor, and a biosensor.

Referring to FIG. 4 again, the mobile device of FIG. 4 may further include a first mode setting unit MU1 for setting which one of the motion information MOU_Inf and the touch information TOU_Inf the USB UI data generation unit UUDG changes to obtain the USB UI data USB_UID. That is, the first mode setting unit MU1 may transmit a first mode signal XMOD1 indicating which one of the motion information MOU_Inf and the touch information TOU_Inf is to be used, to the USB UI data generation unit UUDG, in response to a first control signal XCON1. The USB UI data generation unit UUDG may change the motion information MOU_Inf or the touch information TOU_Inf into the USB UI data USB_UID, in response to the first mode signal XMOD1. However, the inventive concept is not limited thereto. The USB UI data generation unit UUDG may also change the motion information MOU_Inf and the touch information TOU_Inf into the USB UI data USB_UID simultaneously, in response to the first mode signal XMOD1.

Figure 9A:
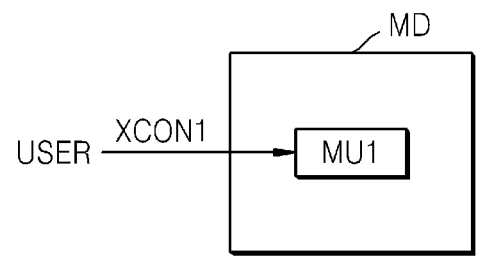
FIGS. 9A through 9C are block diagrams of various examples of an application of a first control signal of FIG. 4.
Figure 9B:
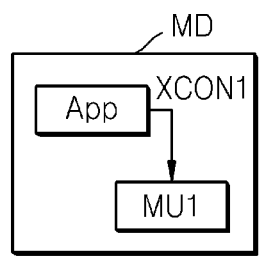
Figure 9C:
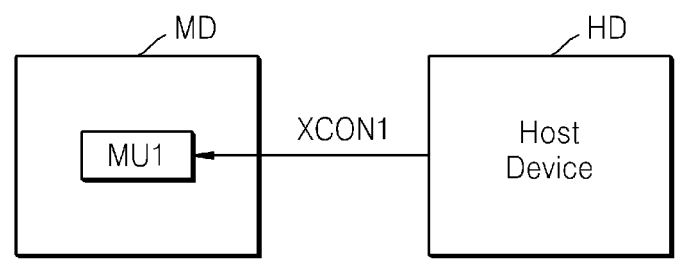

The first control signal XCON1, as illustrated in FIGS. 9A and 9B, may be set by a user of the mobile device MD or may be set from an application App loaded in the mobile device MD. An example in which the first control signal XCON1 is set by the user of the mobile device MD, is explained below. Furthermore, the first control signal XCON1, as illustrated in FIG. 9C, may be set from the host device HD.

Figure 10:
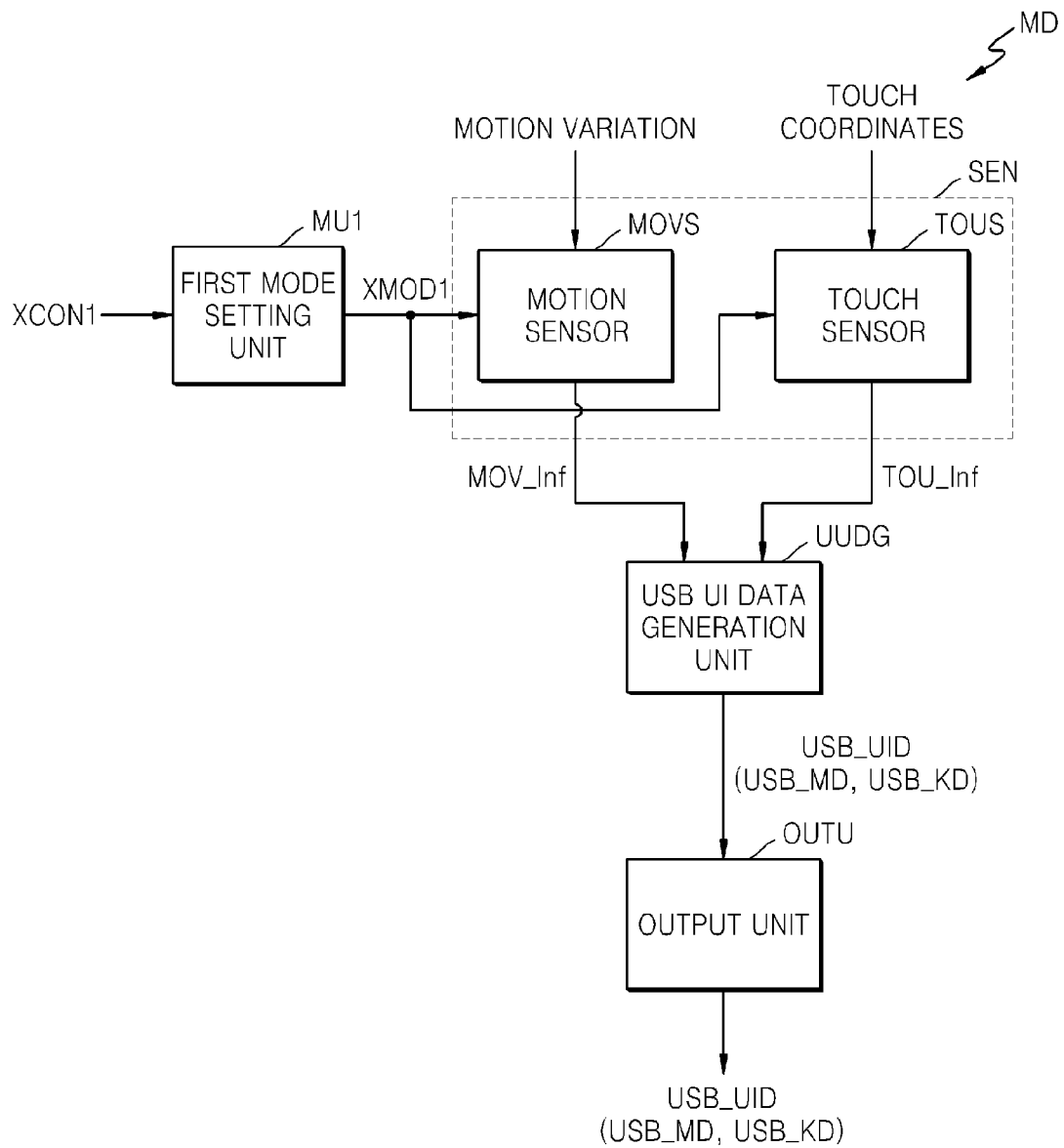
FIGS. 10 through 12 are block diagrams of other examples of the mobile device of FIGS. 1A and 1B.

Furthermore, as shown in FIG. 10, the first mode signal XMOD1 may be transmitted directly to the motion sensor MOVS and the touch sensor TOUS, and turning on and turning off the motion sensor MOVS or the touch sensor TOUS may be controlled depending on whether the first mode signal XMOD1 is used for the generation of the USB UI data USB_UID.

Figure 11:
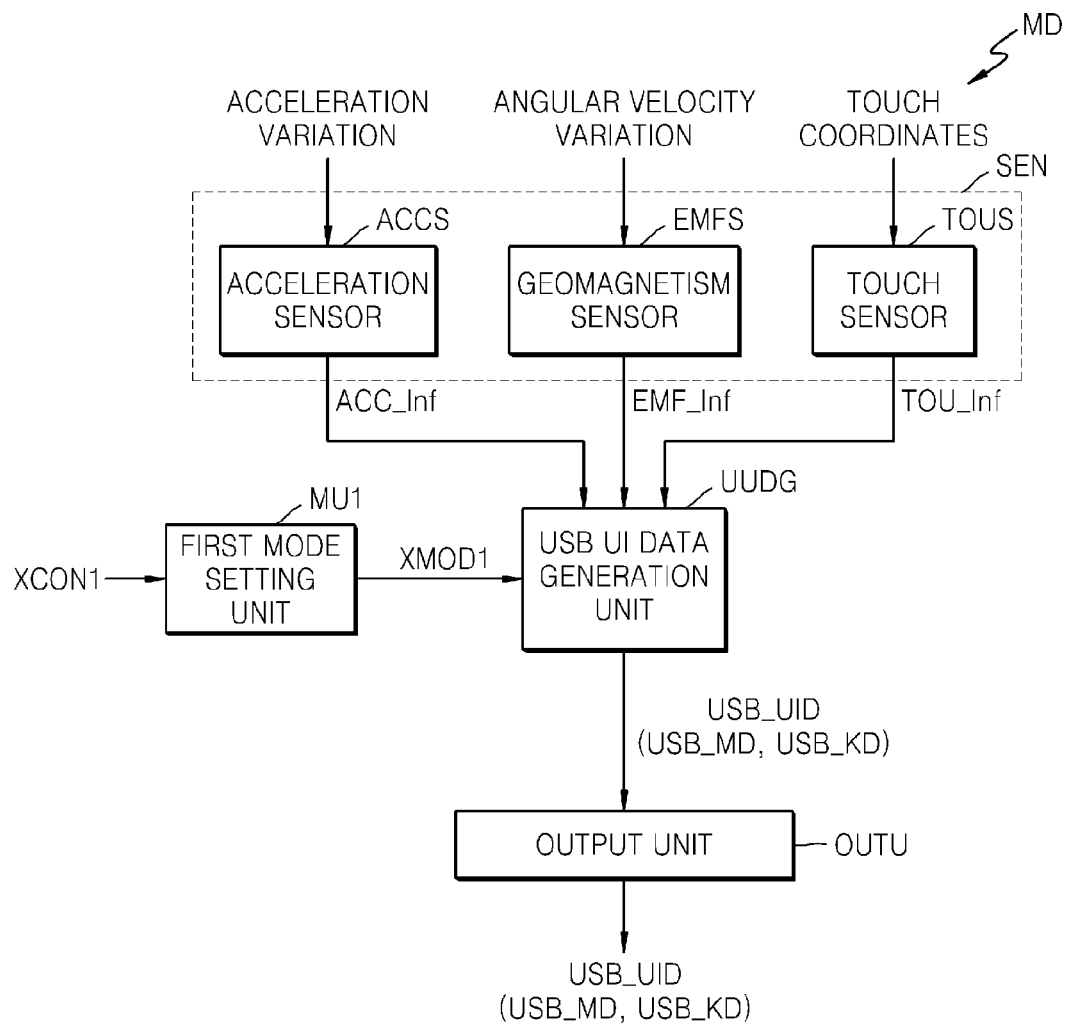

FIG. 11 is a block diagram further illustrating another possible example of the mobile device of FIGS. 1A and 1B Referring to FIG. 11, similar to the mobile device MD of FIG. 4, the mobile device MD of FIG. 11 includes the USB UI data generation unit UUDG for changing the sensing information SEN-Inf into the USB UI data USB_UID, and the output unit OUTU for receiving the USB UI data USB_UID and for outputting the USB UI data USB_UID. However, the sensor unit SEN of the mobile device MD of FIG. 11 includes the acceleration sensor ACCS, geomagnetism sensor EMFS, and touch sensor TOUS. Here, the first mode setting unit MU1 may transmit the first mode signal XMOD1 indicating which one of the acceleration information ACC_Inf, the angular velocity information EMF_Inf, and the touch information TOU_Inf respectively generated by the acceleration sensor ACCS, the geomagnetism sensor EMFS, and the touch sensor TOUS is to be used, to the USB UI data generation unit UUDG, in response to the first control signal XCON1.

The USB UI data generation unit UUDG may change the acceleration information ACC_Inf, the angular velocity information EMF_Inf, or the touch information TOU_Inf into the USB UI data USB_UID, in response to the first mode signal XMOD1. However, the inventive concept is not limited to only these approaches. The USB UI data generation unit UUDG may also change at least two of the acceleration information ACC_Inf, the angular velocity information EMF_Inf, and the touch information TOU_Inf into the USB UI data USB_UID simultaneously, in response to the first mode signal XMOD1.

Figure 12:
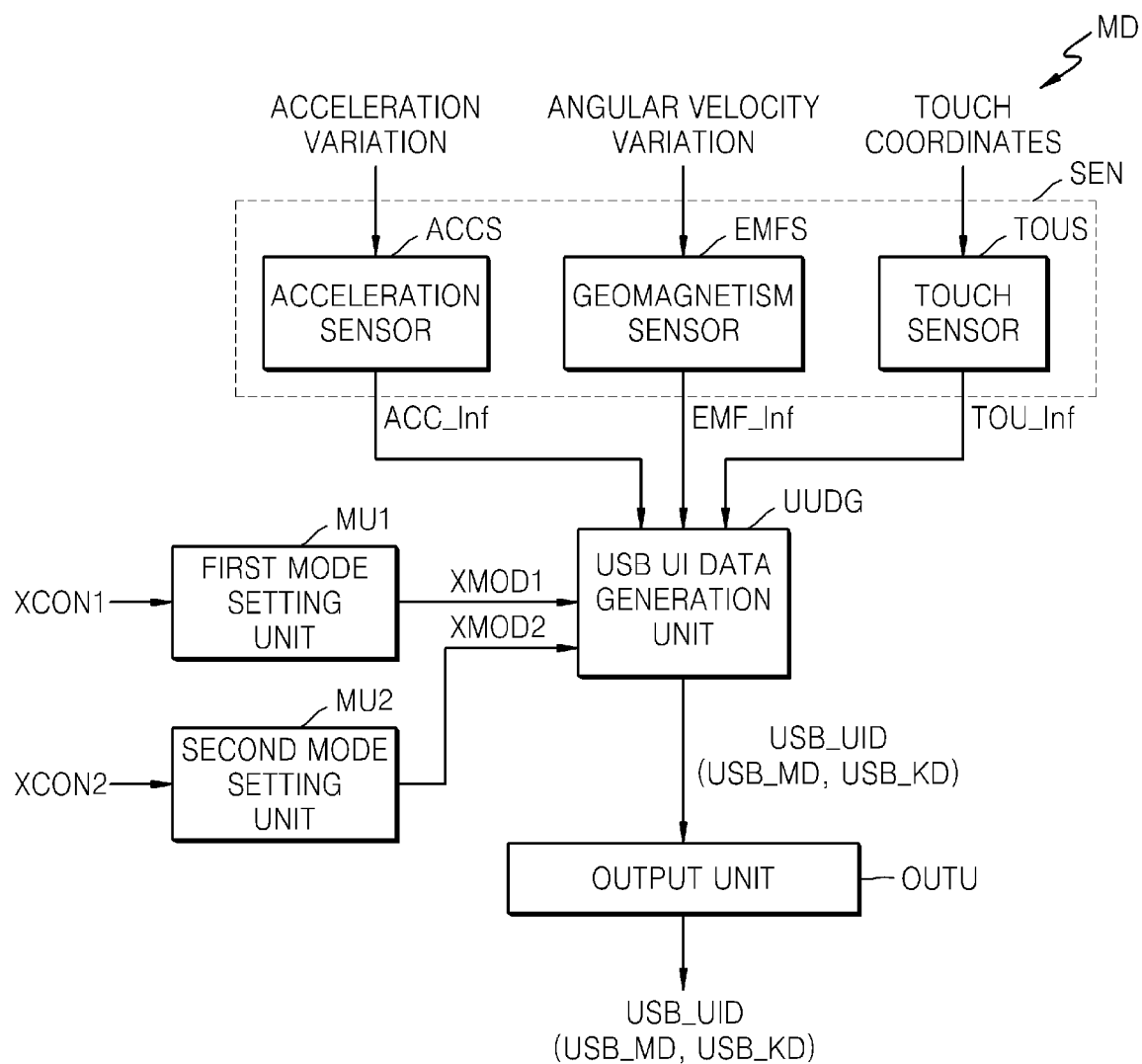

FIG. 12 is a block diagram further illustrating yet another possible example of the mobile device of FIGS. 1A and 1B.

Referring to FIG. 12, similar to the mobile device MD of FIG. 11, the mobile device MD of FIG. 12 includes the USB UI data generation unit UUDG for changing the sensing information SEN-Inf into the USB UI data USB_UID, and the output unit OUTU for receiving the USB UI data USB_UID and for outputting the USB UI data USB_UID. Furthermore, similar to the mobile device MD of FIG. 11, the mobile device MD of FIG. 12 includes the acceleration sensor ACCS, the geomagnetism sensor EMFS, and the touch sensor TOUS.

However, the mobile device MD of FIG. 12 further includes a second mode setting unit MU2. The second mode setting unit MU2 may set which one of the USB mouse data USB_MD and the USB keyboard data USB KD the sensing information, which includes the acceleration information ACC_Inf, the angular velocity information EMF_Inf, or the touch information TOU_Inf, is to be converted into. The second mode setting unit MU2 transmits a second mode signal XMOD2 to the USB UI data generation unit UUDG in response to a second control signal XCON2. The second control signal XCON2, similar to the aforementioned first control signal XCON1, may be set by a user of the mobile device MD or may be set from an application App loaded in the mobile device MD. Furthermore, the second control signal XCON2 may be set from the host device HD.

The USB UI data USB_UID, as mentioned above, may be the USB mouse data USB_MD or the USB keyboard data USB_KD. However, the inventive concept is not limited to only these approaches. The USB UI data USB_UID may be generated as various types of data which may be input to the host device, like, for example, sound data.

FIGS. 13A and 13B are diagrams illustrating data structures for the USB mouse data USB_MD and the USB keyboard data USB_KD described in FIG. 12. Referring to FIG. 13A, the USB mouse data USB_MD may include a changed mouse button value, a changed mouse X axis coordinate value, a changed mouse Y axis coordinate value, and a changed mouse wheel value. For example, the mouse X axis coordinate value and the mouse Y axis coordinate value may be processed as an input of the host device HD, so that the mouse X axis coordinate value and the mouse Y axis coordinate value correspond to coordinates of a mouse point displayed on the display screen of the host device HD.

Here, the USB UI data generation unit UUDG in FIG. 12 according to an embodiment of the inventive concept receives the acceleration information ACC_Inf, the angular velocity information EMF_Inf, or the touch information TOU_Inf corresponding to the acceleration variation illustrated in FIG. 5C, the angular velocity variation illustrated in FIG. 6C, or the touch coordinates illustrated in FIG. 8C, respectively. Furthermore, the USB UI data generation unit UUDG changes the sensing information, that is, the acceleration information ACC_Inf, the angular velocity information EMF_Inf, or the touch information TOU_Inf, into the USB UI data USB_UID corresponding to input data of the host device HD.

For example, the USB UI data generation unit UUDG according to an embodiment of the inventive concept may read a value of touch coordinates of the mobile device MD in each of predetermined periods, and, as illustrated in FIG. 14, in the case where the touch coordinates at the first point of time are (10, 10) and the touch coordinates at the second point of time are (20, 20), may transmit the USB mouse data USB_MD having "0 10 10 0" corresponding to a variation (10, 10) of the touch coordinates, to the host device HD which is connected to the mobile device MD by wire or wirelessly. The host device HD may process the USB mouse data USB_MD having "0 10 10 0" as a corresponding mouse input, and may move a mouse point on the monitor of the host device HD from a0(x0, y0) to a1(x1, y1). Although not illustrated, in the example of FIG. 14, a header for the USB communication may be included in the USB mouse data USB_MD.

Next, referring to FIG. 13C, the USB keyboard data USB_KD may include a changed direction key value and a changed key buffering value. For example, the USB keyboard data USB_KD includes 6 fields in which 6 changed key buffering values may be stored. Because a plurality of keyboard inputs may be generated in a short time, as illustrated in FIG. 13B, it is necessary to include the plurality of buffering values in the USB keyboard data USB_KD.

Figure 15A:
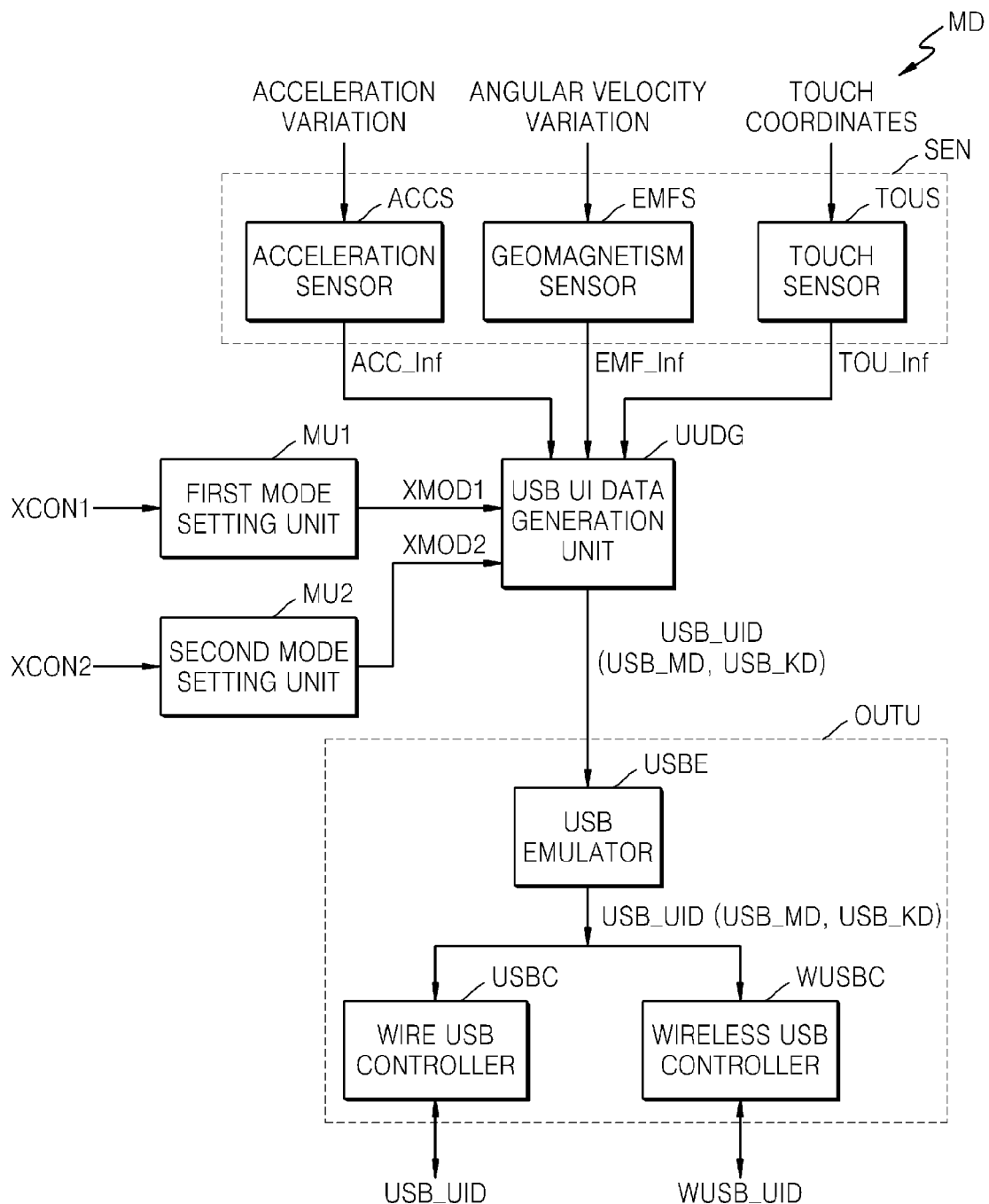
FIG. 15A is a block diagram of another example of the mobile device of FIG. 1.

FIG. 15A is a block diagram further illustrating still another possible example of the mobile device of FIGS. 1A and 1B.

Referring to FIG. 15A, the mobile device MD of FIG. 15A is the similar to the mobile device MD of FIG. 12, except for the output unit OUTU. That is, the mobile device MD of FIG. 15A includes the acceleration sensor ACCS, the geomagnetism sensor EMFS, and the touch sensor TOUS, and further includes the USB UI data generation unit UUDG for changing the sensing information, which includes the acceleration information ACC_Inf, the angular velocity information EMF_Inf, or the touch information TOU_Inf, into the USB UI data USB_UID, and the output unit OUTU for receiving the USB UI data USB_UID and for outputting the USB UI data USB_UID. Furthermore, similar to the mobile device MD of FIG. 12, the mobile device MD of FIG. 15A may further include the first mode setting unit MU1 and the second mode setting unit MU2. However, the inventive concept is not limited thereto. The mobile device MD of FIG. 15A may be the same as the mobile device MD of FIG. 4 except for the output unit OUTU.

The output unit OUTU of the mobile device MD of FIG. 15A may include a USB emulator USBE and USB controllers USBC and WUSBC to output the USB UI data USB_UID to the external host device HD. Unlike in FIG. 2D or FIG. 2E, the USB controllers may include a wired USB controller USBC for transmitting the USB UI data USB_UID to the external host device HD by wire, and a wireless USB controller WUSBC for transmitting the USB UI data USB_UID to the external host device HD wirelessly. The USB emulator USBE may transmit the USB UI data USB_UID to the wired USB controller USBC, in the case where the wired USB controller USBC is connected to the host device HD by a USB cable. On the other hand, in the case where the wired USB controller USBC is not connected to the host device HD by the USB cable, the USB emulator USBE may transmit the USB UI data USB_UID to the wireless USB controller WUSBC. In the case where a power supply voltage is applied to the wired USB controller USBC or the wireless USB controller WUSBC and the wired USB controller USBC or the wireless USB controller WUSBC is connected to the host device HD by the USB, the USB emulator USBE may be set by a variable value corresponding to a connection thereto, and thus it is possible to check whether the mobile device and the host device are connected to each other by the wired USB or by the wireless USB.

Figure 15B:
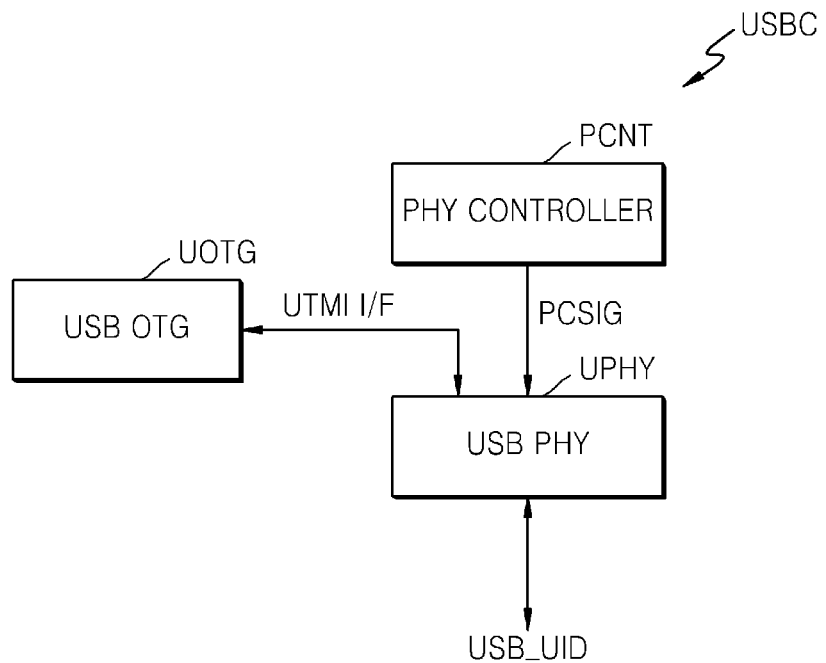
FIG. 15B is a block diagram of an example of a wire USB controller of FIG. 15A.

As illustrated in FIG. 15B, the wired USB controller USBC may include a physical (PHY) layer UPHY and a PHY controller PCNT. The PHY layer UPHY transmits the USB UI data USB_UID to the host device and receives the USB UI data USB_UID from the host device. The PHY layer UPHY may include a receiver detection unit (not shown) for determining whether the mobile device is connected to the host by the USB. Furthermore, in the USB 3.0, the PHY layer UPHY may include a receiving port and a transmitting port separately. The PHY controller PCNT controls an operation of the PHY layer UPHY by a control signal PCSIG. The wired USB controller USBC also may further include a USB on-the-go (OTG) UOTG for controlling the PHY layer UPHY so that operations between other mobile devices may be performed without intervention of the host device. The USB OTG UOTG is a supplement to the conventional USB standard, in which two protocols, that is, a host negotiation protocol (HNP) in which each of peripheral devices may perform a host function in a limited range so that point to point communication may be performed between the peripheral devices, and a session request protocol (SRP) in which a connection between a device and a counterpart device is maintained only in the case where there is a request of the counterpart device to reduce power consumption, are further added. The USB OTG UOTG interfaces with the PHY layer UPHY by a UTMI which is a USB 2.0 transceiver macro-cell interface (TMI) developed by Intel®.

Figure 15C:
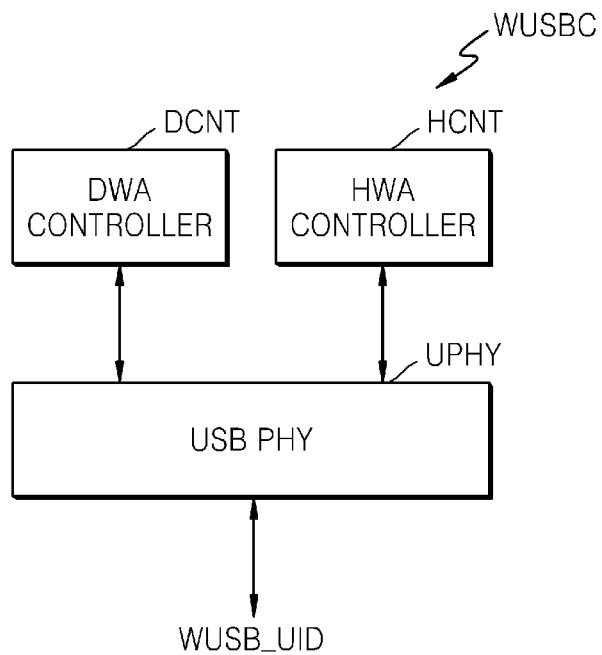
FIG. 15C is a block diagram of an example of a wireless USB controller of FIG. 15A.

The wireless USB controller WUSBC, as illustrated in FIG. 15C, may include the PHY layer UPHY, a device wire adaptor (DWA) controller DCNT, and a host wire adaptor (HWA) controller HCNT. The PHY layer UPHY may operate similarly to the PHY layer UPHY illustrated in FIG. 15B. The DWA controller DCNT and the HWA controller HCNT operate as a wired adapter introduced to take over conventional software properties, that is, to make the conventional host and devices communicate wirelessly, in the case of making a conventional USB 2.0 operate wirelessly. Here, the DWA controller DCNT may be formed in the mobile device side, and the HWA controller HCNT may be formed in the host device side. However, the host device HD according to an embodiment of the inventive concept, as illustrated in FIG. 42, may also be embodied by the mobile device according to an embodiment of the inventive concept, and thus, in FIG. 15C, the case where the mobile device MD also includes the HWA controller HCNT is illustrated.

Figures 15D, 15E:
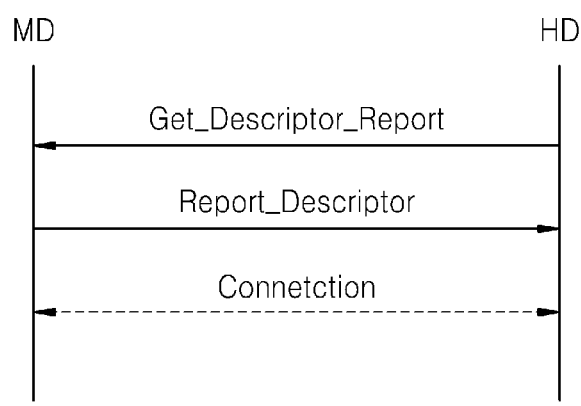
FIG. 15D is a diagram illustrating an operation of connecting the mobile device of FIG. 15A and a host device to each other.
FIG. 15E is a diagram illustrating an example in which the USB mouse data is transmitted.

FIG. 15D illustrates one possible approach to the connecting of the mobile device MD with the host device HD via a USB connection (wired and/or wireless). First, the mobile device MD and the host device HD exchange initial packets through the USB cable USB_CA or antennas ANT1 and ANT2 of FIG. 1A, and thereafter the host device HD requests the mobile device MD for "Report_Descriptor" by transmitting "Get_Descriptor-Report" to the mobile device MD. In response to this request, the mobile device MD transmits a table containing information stored about the mobile device MD such as a device type and characteristics, to the host device (Report_Descriptor). Only one request and one report are illustrated in FIG. 15D, but several requests and several reports may be transmitted and received.

When a USB connection between the mobile device MD and the host device HD is initialized through the operation of FIG. 15D, the host device HD may recognize the mobile device MD. Next, when an event occurs, the mobile device MA, as mentioned above, may transmit the USB mouse data USB_MD or the USB keyboard data USB_KD to the host device HD.

FIG. 15E illustrates an example in which the USB mouse data USB_MD is transmitted.

Referring to FIG. 15E, the transmitted USB mouse data USB_MD includes a transmission order (Transfer="15"), a field (Interrupt="IN", where IN illustrates a data transmission direction from the mobile device to the host.) containing an interrupt transmission form, a discrimination ruler (ADDR="1") of the mobile device in which an interrupt occurs, and a field indicating that the type of the transmitted user data is "MOUSE". Furthermore, the transmitted USB mouse data USB_MD includes information (Buttons="0x00") indicating that an related to operation the mouse button has not been generated, and information indicating variation for the X coordinates is "1".

Figure 16A:
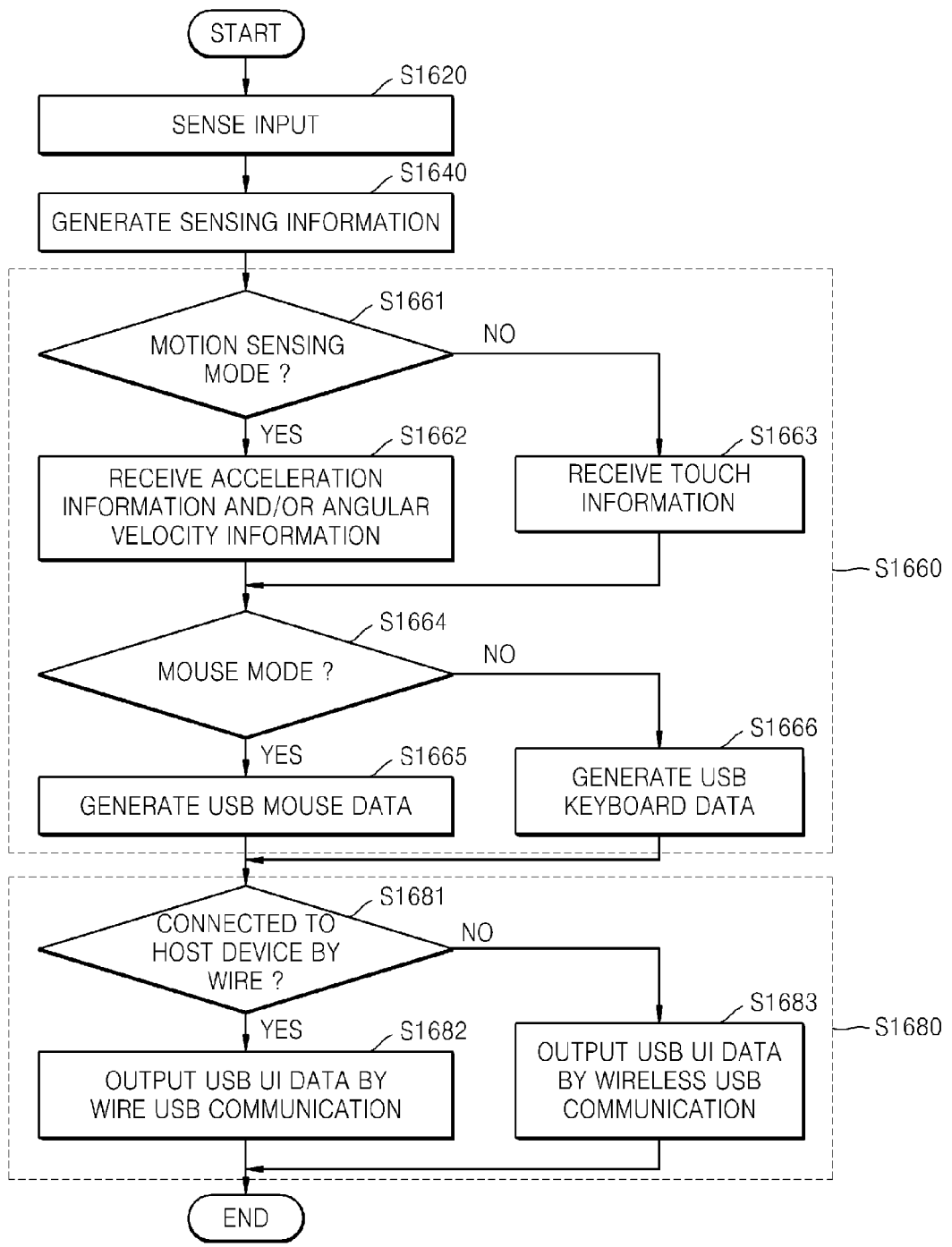
FIG. 16A is a flowchart illustrating an example of a method of operating the mobile device of FIG. 15A.

FIG. 16A is a flowchart summarizing one possible method of operation for the mobile device MD of FIG. 15A according to an embodiment of the inventive concept.

Referring to FIGS. 15A and 16A, in the operating method for the mobile device MD, an input of the sensor unit SEN of the mobile device MD is sensed (S1620), and thus the sensing information ACC_Inf, EMF_Inf, or TOU_Inf is generated (S1640). Next, the sensing information ACC_Inf, EMF_Inf, or TOU_Inf is changed into the USB UI data USB_UID, that is, the USB mouse data USB_MD or the USB keyboard data USB_KD (S1660). That is, the USB UI data generation unit UUDG determines whether a first mode is a motion sensing mode (S1661) and receives the acceleration information ACC_Inf and/or the angular velocity information EMF_Inf in the case where the first mode is the motion sensing mode (S1661). In the motion sensing mode, the USB UI data generation unit UUDG may receive only the acceleration information ACC_Inf and/or the angular velocity information EMF_Inf without receiving the touch information TOU_Inf, in response to the first mode signal XMOD1. Alternatively, in response to the first mode signal XMOD1, in the motion sensing mode, the USB UI data generation unit UUDG may receive the touch information TOU_Inf too, but the USB UI data generation unit UUDG may not use the touch information TOU_Inf to generate the USB UI data USB_UID. On the other hand, in the case where the first mode is not the motion sensing mode (S1661), that is, in the case where the first mode is a touch mode, the USB UI data generation unit UUDG receives the touch information TOU_Inf (S1663).

The USB UI data generation unit UUDG generates the USB UI data USB_UID with the acceleration information ACC_Inf and/or the angular velocity information EMF_Inf, or the touch information TOU_Inf, according to the first mode (S1665 or S1666). Here, the USB UI data generation unit UUDG generates the USB mouse data USB_MD or the USB keyboard data USB_KD as the USB UI data USB_UID, according to the second mode (S1665 or S1666). That is, in the case where the second mode is determined to be a mouse mode (S1664), the USB UI data generation unit UUDG generates the USB mouse data USB_MD by using the acceleration information ACC_Inf and/or the angular velocity information EMF_Inf, or generates the USB mouse data USB_MD by using the touch information TOU_Inf (S1665). On the other hand, in the case where the second mode is determined to be a keyboard mode (S1664), the USB UI data generation unit UUDG generates the USB keyboard data USB_KD by using the acceleration information ACC_Inf and/or the angular velocity information EMF_Inf, or generates the USB keyboard data USB_KD by using the touch information TOU_Inf (S1666).

The USB UI data USB_UID which is the USB mouse data USB_MD or the USB keyboard data USB_KD, is output by wire or wirelessly according to whether the mobile device MD is connected to the host device HD (S1680). That is, in the case where it is determined that the host device HD and the mobile device MD are connected to each other by the wired USB cable (S1681), the output unit OUTU outputs the USB UI data USB_UID by wired USB communication (S1682). On the other hand, in the case where it is determined that the host device HD and the mobile device MD are not connected to each other by the wired USB cable (S1681), the output unit OUTU outputs the USB UI data WUSB_UID by wireless USB communication (S1683).

Figure 16B:
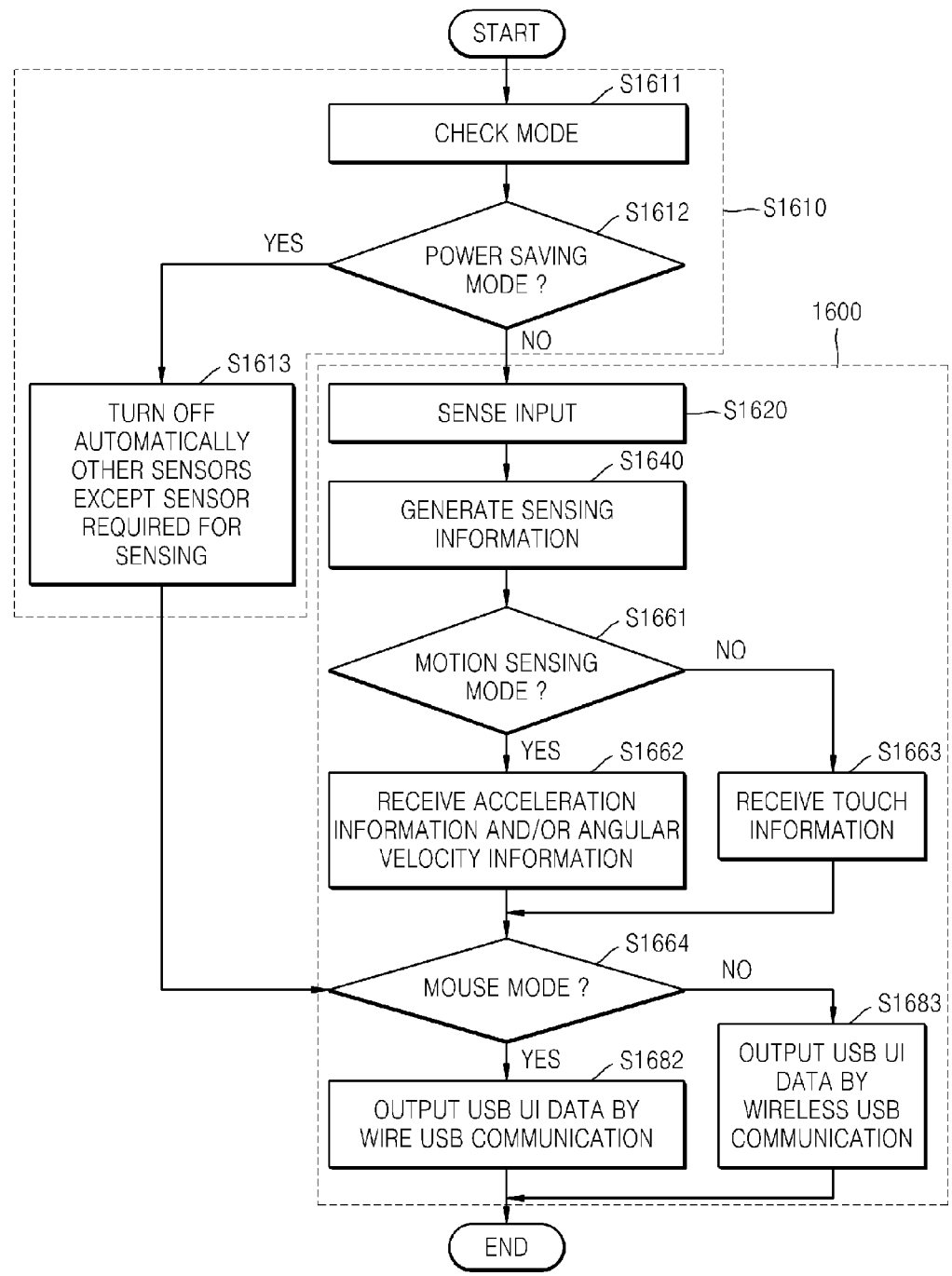
FIG. 16B is a flowchart illustrating another example of a method of operating the mobile device of FIG. 15A.

FIG. 16B is a flowchart illustrating another possible method of operation for the mobile device MD of FIG. 15A according to another embodiment of the inventive concept.

Referring to FIGS. 15A and 16B and unlike in the operating method of FIG. 16A, it is determined whether the mobile device MD operates in a power saving mode, and control of the sensor unit SEN is changed according to whether the mobile device MD operates in the power saving mode (S1610). For this, an operation mode of the mobile device MD is checked (S1661), and the mobile device operates in the same manner as the operating method 1600 of FIG. 16A in the case where it is determined that the operation mode is not the power saving mode (S1612).

Figure 16C:
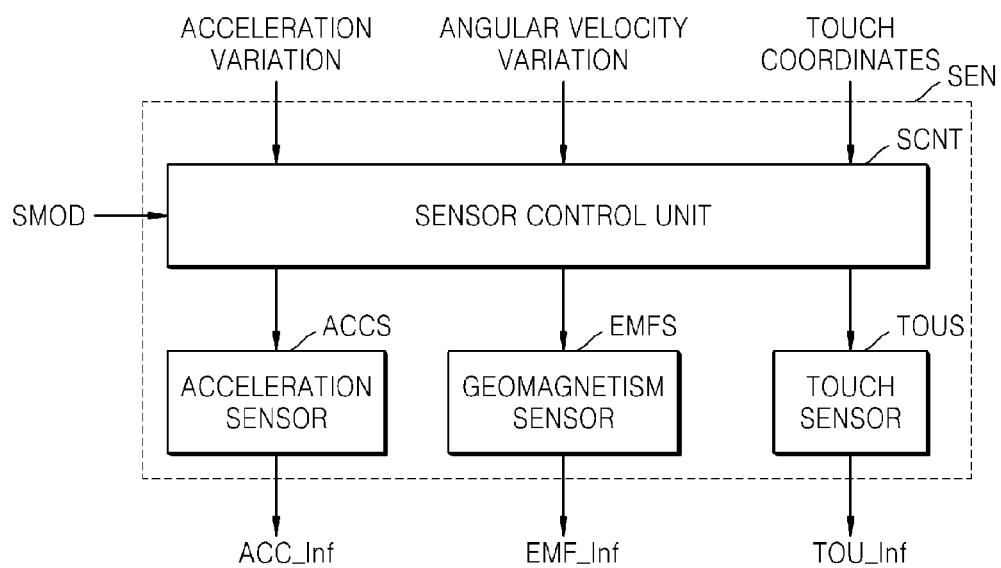
FIG. 16C is a block diagram illustrating a sensor controller included in a sensor unit in FIG. 15A that is used in the method of FIG. 16B.

On the other hand, in the case where it is determined that the operation mode is the power saving mode (S1612), other sensors, except for a sensor required for sensing, are turned off automatically. For example, in the case where, in the power saving mode, only the acceleration of the mobile device MD is changed, the geomagnetism sensor EMFS and the touch sensor TOUS, but not the acceleration sensor ACCS, of FIG. 15A may be turned off automatically. To perform this operation, the sensor unit SEN of the mobile device MD of FIG. 15A may include a sensor control unit SCNT of FIG. 16C. The sensor control unit SCNT activates only a sensor corresponding to a variation of the mobile device, according to a power saving mode signal SMOD. In the context of the above example and in a case where the power saving mode activated, only the acceleration of the mobile device MD is changed. That is, in the case where only the acceleration variation from among the acceleration variation, angular velocity variation, and the touch coordinates is received in the sensor unit SEN, the sensor control unit SCNT may turn off automatically the geomagnetism sensor EMFS and the touch sensor TOUS but not the acceleration sensor ACCS.

As mentioned above, the mobile device according to an embodiment of the inventive concept may reduce overall power consumption, which is an important issue in the design and operation of mobile devices by using only the minimum power required for sensing during the power saving mode.

Several more detailed examples of possible structures and methods of operation for the above computational systems will now be described.

Figure 17A:
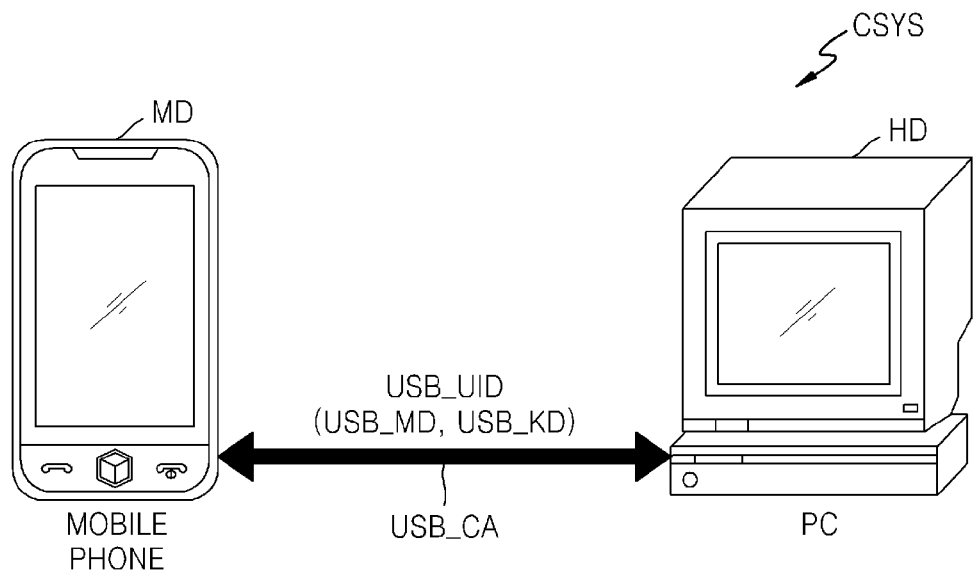
FIGS. 17A and 17B are diagrams illustrating an example of the computational system of FIG. 1.
Figure 17B:
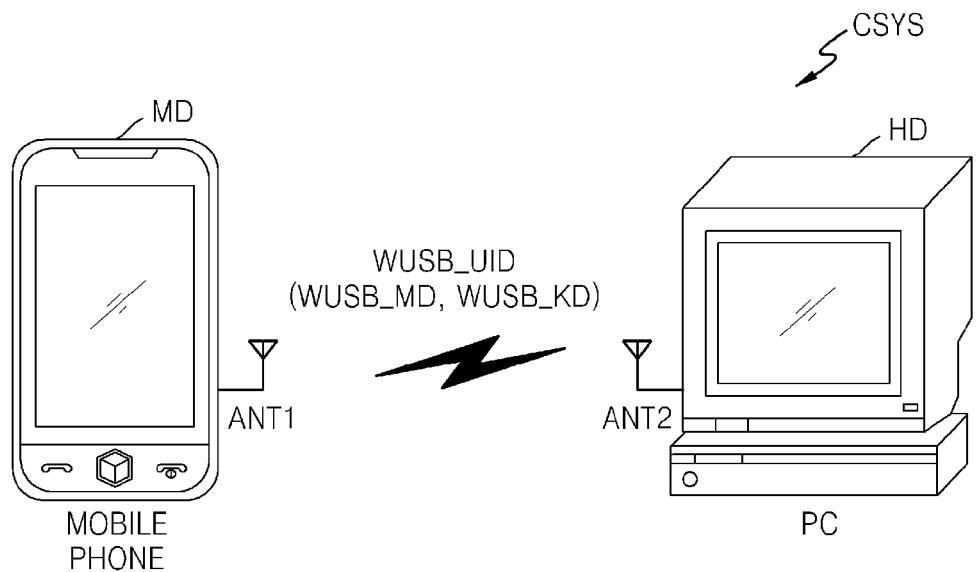

FIGS. 17A and 17B are diagrams further illustrating examples of the computational system CSYS of FIG. 1.

Referring to FIGS. 17A and 17B, the mobile device MD of the computational system CSYS according to an embodiment of the inventive concept may be a mobile phone. Furthermore, the host device HD of the computational system CSYS according to an embodiment of the inventive concept may be a personal computer PC. The mobile device MD, as illustrated in FIGS. 18A and 18B, may provide an interface in which the user may set the first mode and/or the second mode described in relation to FIG. 12 and the like, to a display screen DIS.

Figure 18A:
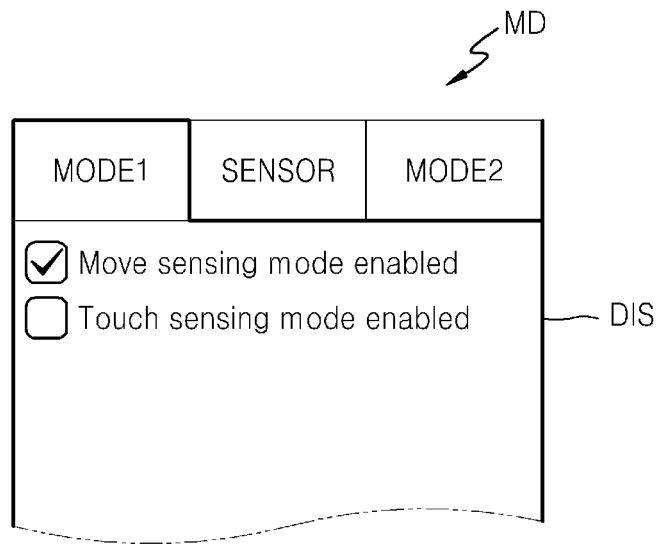
FIGS. 18A and 18B are diagrams for explaining an operation in which a first mode and a second mode are set in the computational system of FIGS. 17A and 17B.

In the example of FIG. 18A, the user may touch a first mode button MODE1 on the display screen DIS of the mobile device MD. In the case where the first mode button MODE1 is selected, a list for the first mode, which the user may select, is displayed on the display screen DIS. In the example of FIG. 18A, the user may select a motion sensing mode for generating the USB UI data USB_UID corresponding to a motion of the mobile device MD. Furthermore, in the example of FIG. 18B, the user may touch a second mode button MODE2. In the case where the second mode button MODE2 is selected, a list for the second mode, which the user may select, is displayed on the display screen DIS. In the example of FIG. 18B, the user may select a mouse mode for generating the USB UI data USB_UID corresponding to the USB mouse data USB_MD.

Here, the first mode setting unit MU1 illustrated in FIG. 15A may output the first mode signal XMOD1 in response to the first control signal XCON1 representing a selection of the user shown in FIG. 18A. Similarly, the second mode setting unit MU2 may output the second mode signal XMOD2 in response to the second control signal XCON2 representing a selection of the user shown in FIG. 18B.

Figure 18B:
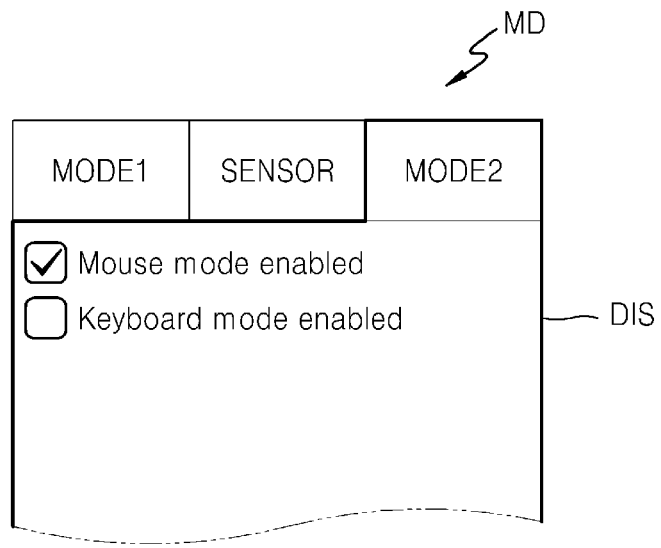

In the case where the first mode and the second mode are set to the motion sensing mode and the mouse mode respectively as shown in FIGS. 18A and 18B, the computational system CSYS according to an embodiment of the inventive concept, as illustrated in FIGS. 19A and 19B, may receive the USB UI data USB_UID corresponding to a motion of the mobile device MD as a mouse input of the host device HD. For example, as illustrated in FIG. 19A, in the case where the mobile device MD is moved in such a manner that a pitch is changed (refer to ⓐ) or an acceleration in the Y axis direction is changed (refer to ⓐ'), the host device HD may process the USB mouse data USB_MD corresponding to a motion ⓐ or ⓐ' of the mobile device MD as corresponding mouse input data, and may move a mouse point from a start point SP to a finish point FP in the vertical direction on the monitor. Furthermore, as illustrated in FIG. 19B, in the case where the mobile device MD is moved in such a manner that a roll is changed ⓑ or an acceleration in the X axis direction is changed (ⓑ'), the host device HD may process the USB mouse data USB_MD corresponding to a motion ⓑ or ⓑ' of the mobile device MD as corresponding mouse input data, and may move a mouse point from a start point SP to a finish point FP in the horizontal direction on the monitor.

FIGS. 19A and 19B further illustrate the case for the mouse mode, but in the case where the second mode in FIG. 18 is set to the keyboard mode, an operation of the computational system CSYS according to an embodiment of the inventive concept in the keyboard mode is similar to the operation of the computational system CSYS in the mouse mode. That is, in the case where the mobile device MD is moved as shown in FIG. 19A in the keyboard mode, the host device HD may recognize this movement as an occurrence of an input, that is, an event of a lower direction key of the keyboard. Similarly, in the case where the mobile device MD is moved as shown in FIG. 19B, the host device HD may recognize this movement as an occurrence of an input, that is, an event of a right side direction key of the keyboard.

Figure 20:
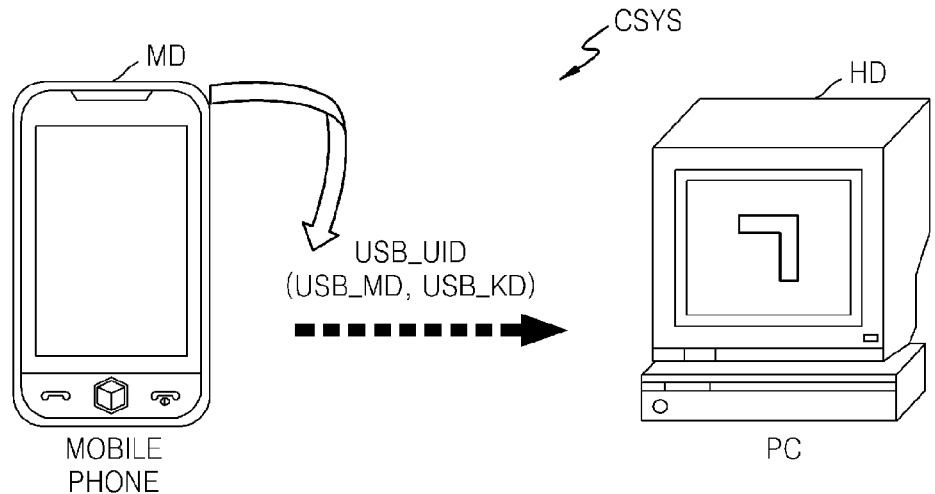

Furthermore, in the keyboard mode, in the case of inputting letters without inputting a direction key, in the case where the mobile device MD is moved in an arrow direction indicating a shape of a letter in FIG. 20, the host device HD may recognize this movement as an occurrence of a keyboard input corresponding to this movement.

Figure 21:
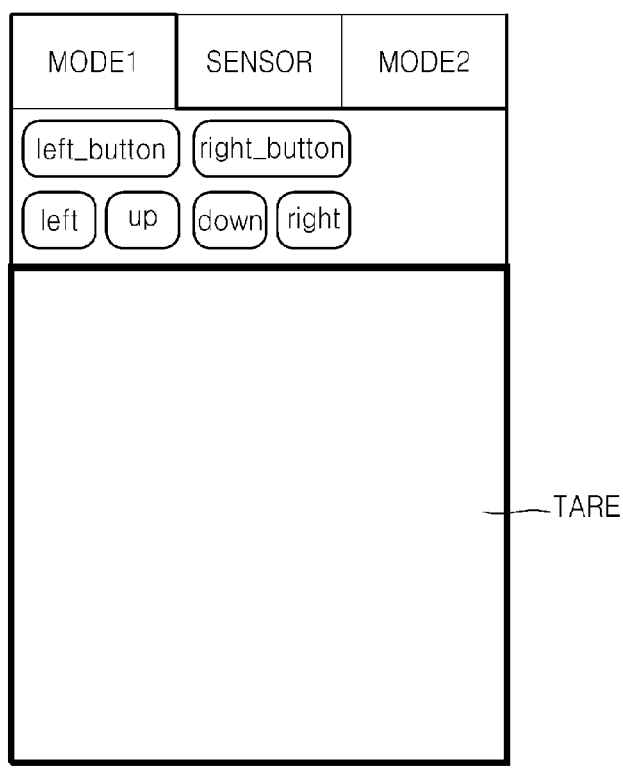
FIGS. 21 through 23B are diagrams for explaining a touch mode operation in the computational system of FIGS. 17A and 17B.

FIG. 21 is a diagram illustrating an example of the display screen of the mobile device in which the first mode in FIG. 18 is set to the touch mode.

Referring to FIG. 21, the mobile device MD in which the first mode is the touch mode, may display a left-button and a right-button which may be touched in the case where the second mode is the mouse mode, and may display left, up, down, and right regions which may be touched in the case where the second mode is the keyboard mode. When the user touches a desired button, the host device HD may receive the USB UI data USB_UID corresponding to the touched button and process the received data as a mouse or keyboard input.

Figure 22A:
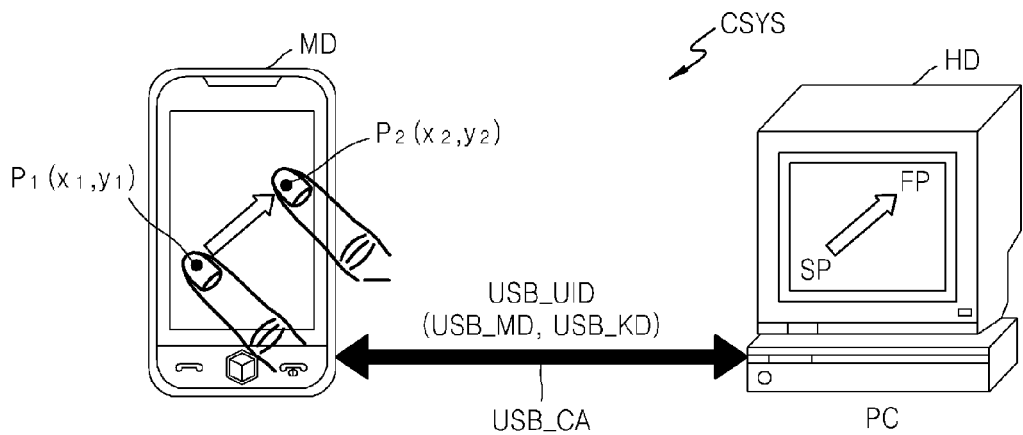
Figure 22B:
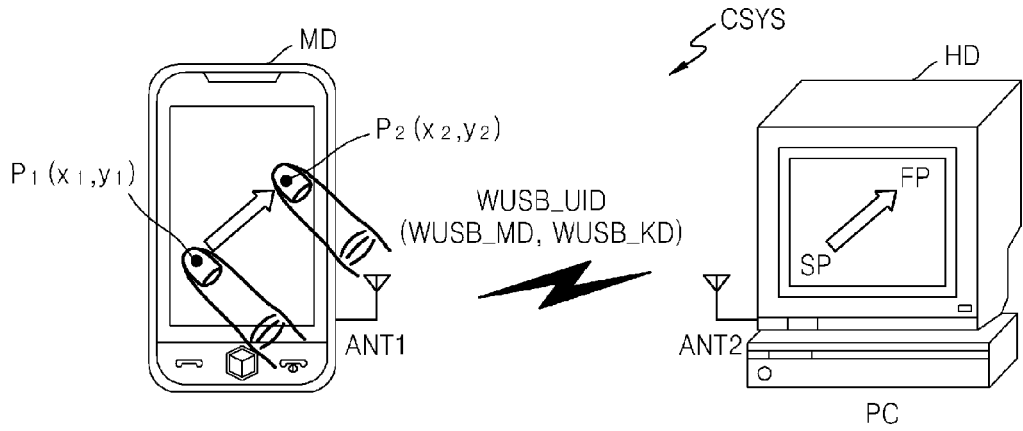

Furthermore, as illustrated in FIGS. 22A and 22B, the USB UI data USB_UID may be generated by touching a touch active region TARE in FIG. 21. For example, as shown in FIG. 22A, in the case where the second mode is the mouse mode and the user drags the touch active region TARE from a first point P1(x1, y1) to a second point P2(x2, y2) in a diagonal direction, the host device HD may process the USB mouse data USB_MD which corresponds to a variation of the touch coordinates from the first point P1(x1, y1) to the second point P2(x2, y2), as a corresponding mouse input, and may move the mouse point from a start point SP to a finish point FP in the diagonal direction on the monitor of the host device HD.

In FIG. 22A, the USB UI data USB_UID is transmitted from the mobile device MD to the host device HD through the USB cable USB_CA. On the other hand, in FIG. 22B, the USB UI data WUSB_UID is transmitted from the mobile device MD to the host device HD by the wireless USB. The case in which the second mode is the keyboard mode, also may operate similarly to the example of FIG. 22. That is, in the case where the user drags the touch active region TARE from a first point P1(x1, y1) to a second point P2(x2, y2) in a diagonal direction, the host device HD may recognize this dragging as an occurrence of a keyboard input corresponding to the movement of the touch coordinates. In the examples of FIGS. 22A and 22B, the host device HD may recognize the above dragging as an occurrence of inputs for a right side direction key and an upper direction key of the keyboard.

Here, the coordinate values of the first point P1(x1, y1) and the second point P2(x2, y2) of the touch active region TARE in the mobile device MD may not be fixed. It is assumed that a direction of the touch screen of the mobile device MD is changed as shown in FIG. 23. For example, in the case where a direction of the touch screen of the mobile device of FIGS. 22A and 22B, is the vertical direction, a direction of the touch screen of the mobile device of FIG. 23 is changed to the horizontal direction. A change in the direction of the touch screen may be sensed by a compass sensor (not shown) included in the mobile device MD.

Figure 23A:
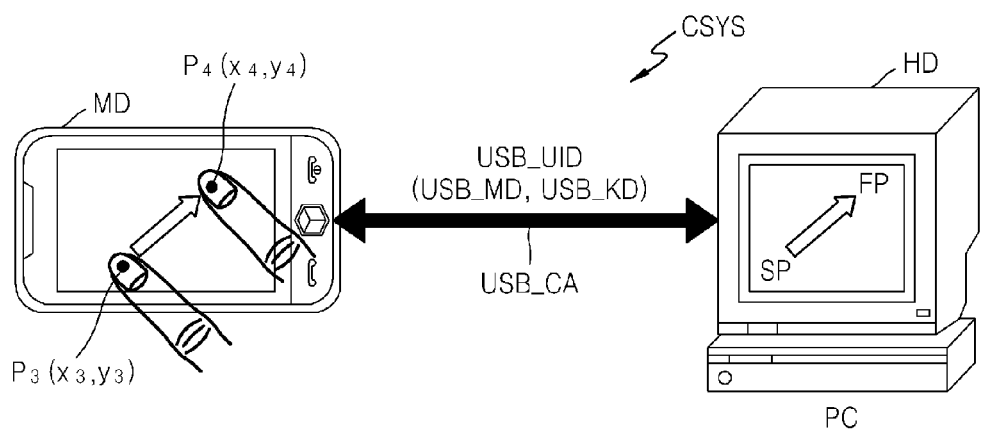
Figure 23B:
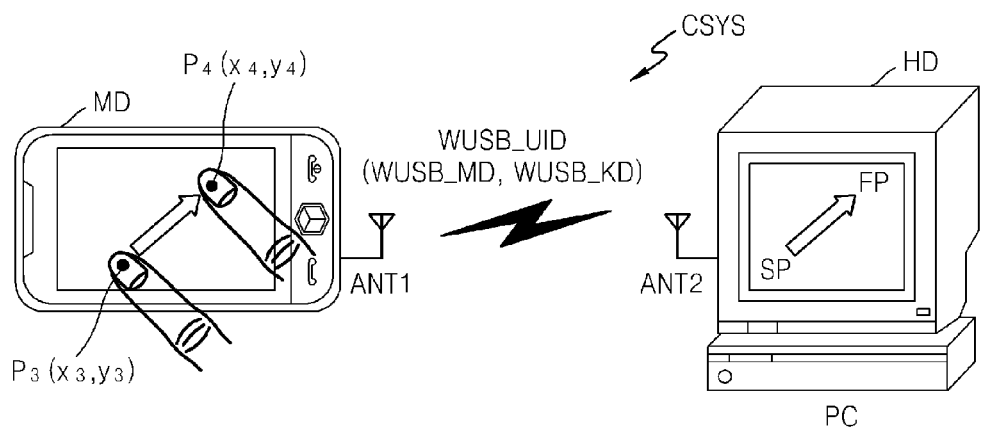

In the case where the vertical direction of the touch screen is set by default, the USB UI data generation unit UUDG may change an X axis value of the touch coordinates into an X axis value on the monitor of the host device HD, and change a Y axis value of the touch coordinates into a Y axis value on the monitor of the host device HD. However, in the case where a direction of the touch screen of the mobile device MD is changed into the horizontal direction, the USB UI data generation unit UUDG may change an X axis value of the touch coordinates into a -Y axis value of the coordinates on the monitor of the host device HD, and change a Y axis value of the touch coordinates into an X axis value of the coordinates on the monitor of the host device HD. As a result, the USB mouse data USB_MD which corresponds to a movement of the touch coordinates from a first point P1(x1, y1) to a second point P2(x2, y2) of FIGS. 22A and 22B, may be equal to the USB mouse data USB_MD which corresponds to a movement of the touch coordinates from a third point P3(x3, y3) to a fourth point P4(x4, y4) of FIG. 23. Accordingly, the host device HD may process a movement of the touch coordinates from a third point P3(x3, y3) to a fourth point P4(x4, y4) in the touch active region TARE of the mobile device MD of FIG. 23, as being the same mouse input as that of FIG. 22. In FIG. 23A, the USB UI data USB_UID is transmitted to the host device HD through the USB cable USB_CA, but on the other hand, in FIG. 23B, the USB UI data WUSB_UID is transmitted to the host device HD by the wireless USB method.

Figure 24A:
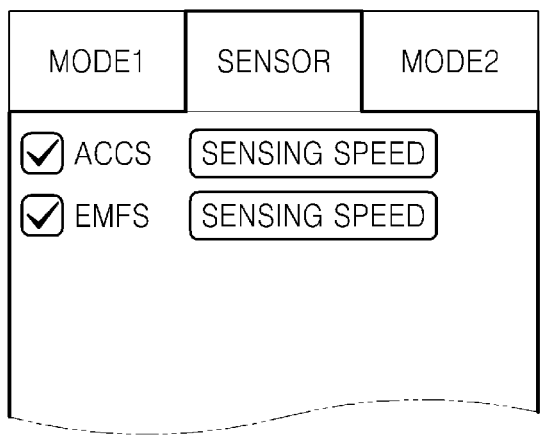
FIGS. 24A and 24B are diagrams for explaining an operation of controlling a sensor in the computational system of FIGS. 17A and 17B.
Figure 24B:
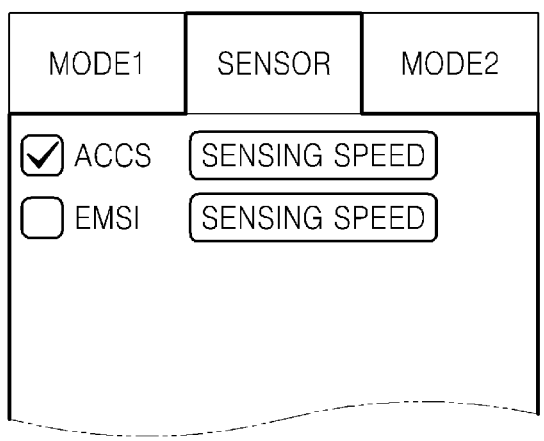

The mobile device MD according to an embodiment of the inventive concept, as illustrated in FIG. 24, may set a turning ON/OFF and a sensing speed for each sensor. FIG. 24A illustrates an example in which the acceleration sensor ACCS and the geomagnetism sensor EMFS in FIG. 15A and the like are turned ON. Furthermore, as illustrated in FIG. 24B, the user may select the acceleration sensor ACCS or the geomagnetism sensor EMFS of FIG. 15A and the like by changing a value of a check box. For example, in the computational system according to an embodiment of the inventive concept, in which an output of the mobile device is processed as an input of the host device, in the case of playing a game through the host device, the user may adaptively control the sensors according to a purpose of an application to be performed, for example, by turning off the geomagnetism sensor and increasing a sensing speed of the acceleration sensor.

In more detail, for example, the user may set the sensors so that only the geomagnetism sensor is activated for an automobile game application which is downloaded in the mobile device, and set the sensor so that only the acceleration sensor is activated for a billiards game application which is downloaded in the mobile device.

Likewise, in the mobile device according to an embodiment of the inventive concept and the computational system including same, it is possible to perform a user interface for the hose device by using the mobile device without an input and output device, and thus the mobile device and the computational system may be less costly, and the mobile device and the computational system may be more easily carried. In particular, in the mobile device according to an embodiment of the inventive concept and the computational system including the mobile device, an interface between the mobile device and the host device may be performed through wired and wireless USB supported by most electronic devices, and thus, because many host devices support USB and it is not necessary to install any additional program for exclusive use in the host device, the mobile device and the computational system may be used broadly. Furthermore, in the mobile device according to an embodiment of the inventive concept and the computational system including the mobile device, an input to the host device may be performed by the mobile device, and thus a game user may interface intuitively and dynamically through the mobile device. Furthermore, the user may control a setting for the sensing value, and thus the mobile device may be used by being optimized to the use of the host device by the user. According to the above merit, the mobile device according to the inventive concept may have a distinction from other mobile devices and be profitable for selling the mobile device products.

Figure 25A:
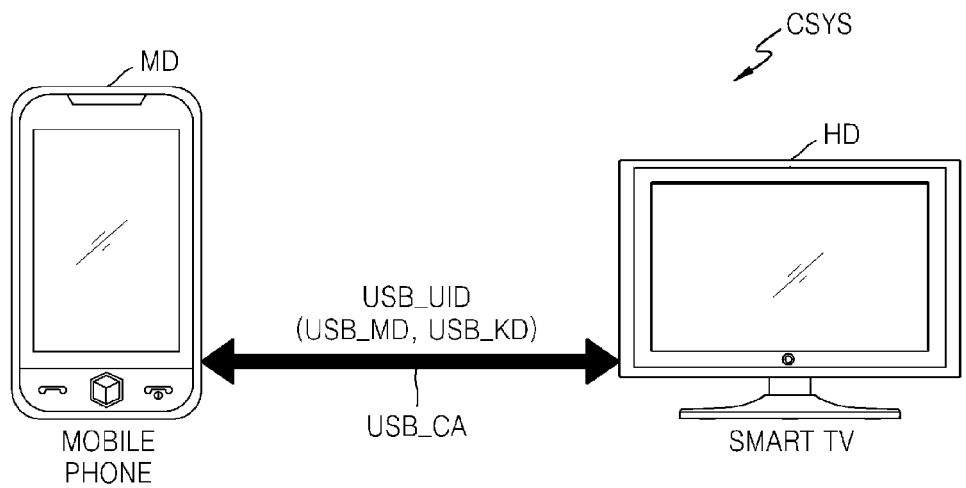
FIGS. 25A and 25B are diagrams illustrating another example of the computational system of FIG. 1.
Figure 25B:
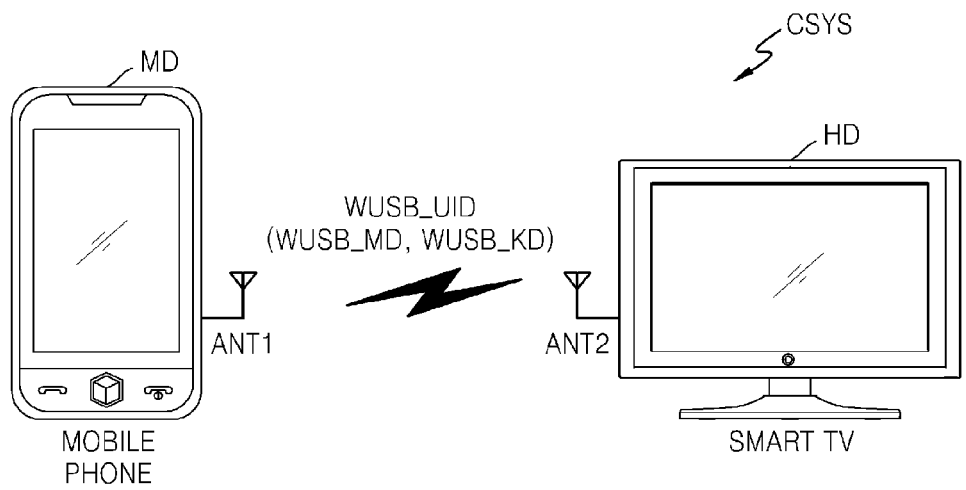
Figure 26A:
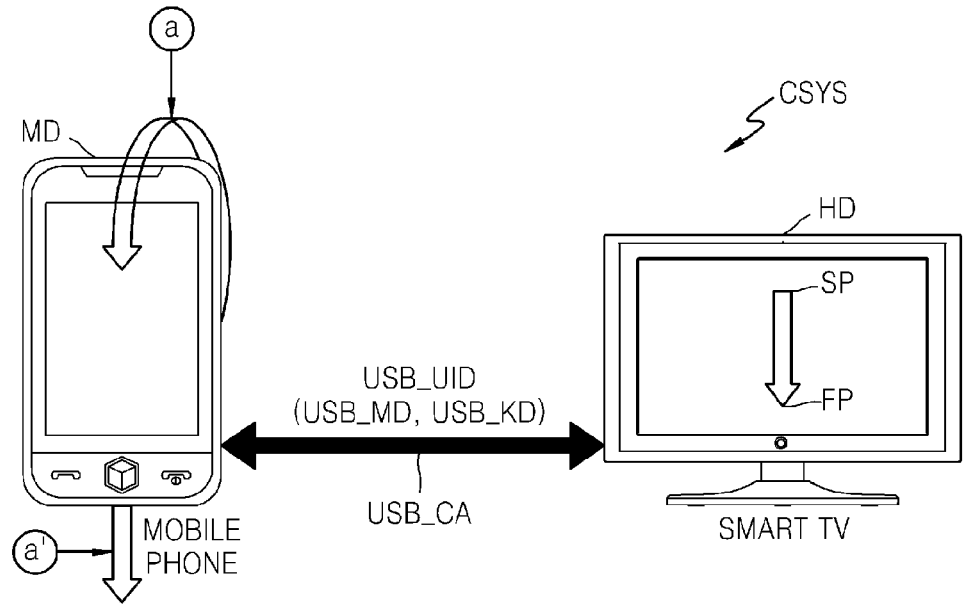
FIGS. 26A through 27B are diagrams for explaining an operation of the computational system of FIGS. 25A and 25B.
Figure 26B:
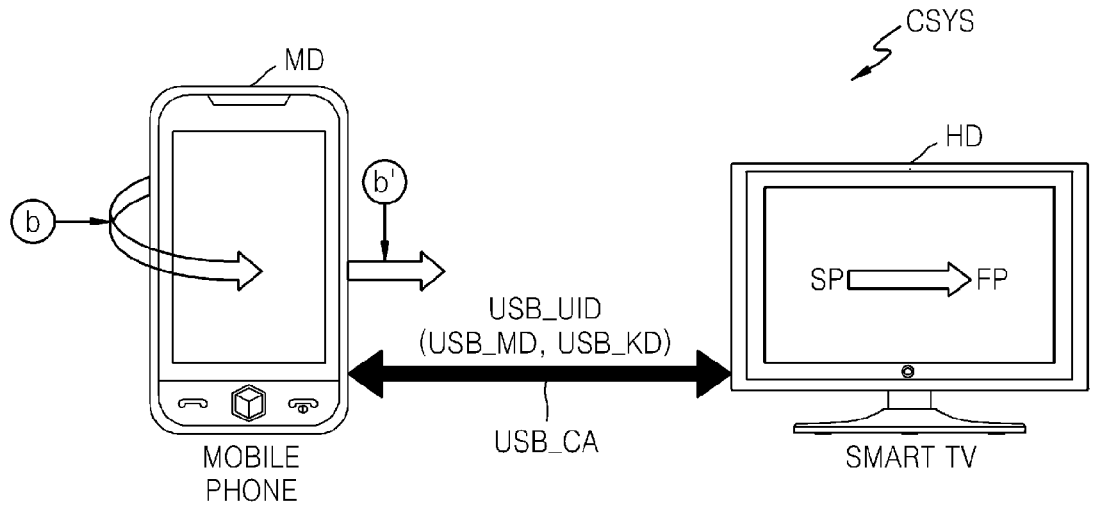
Figure 27A:
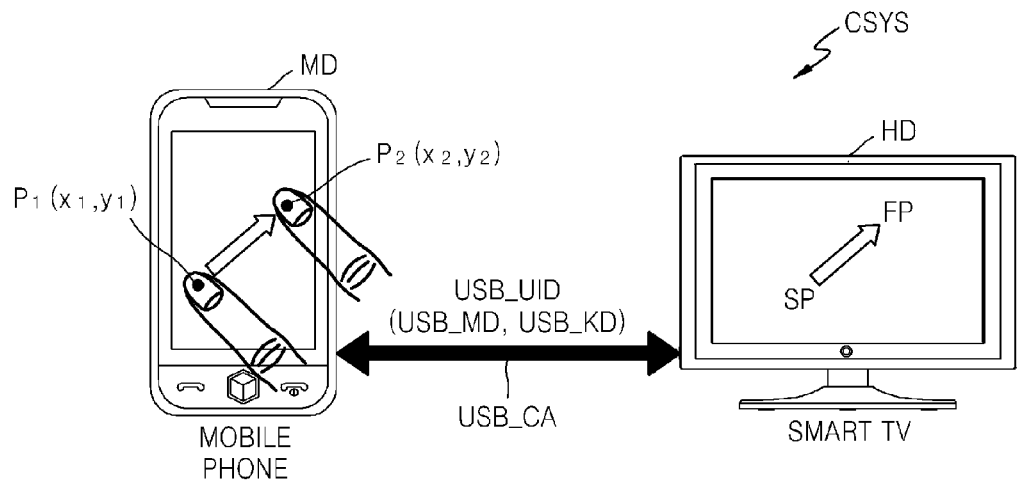
Figure 27B:
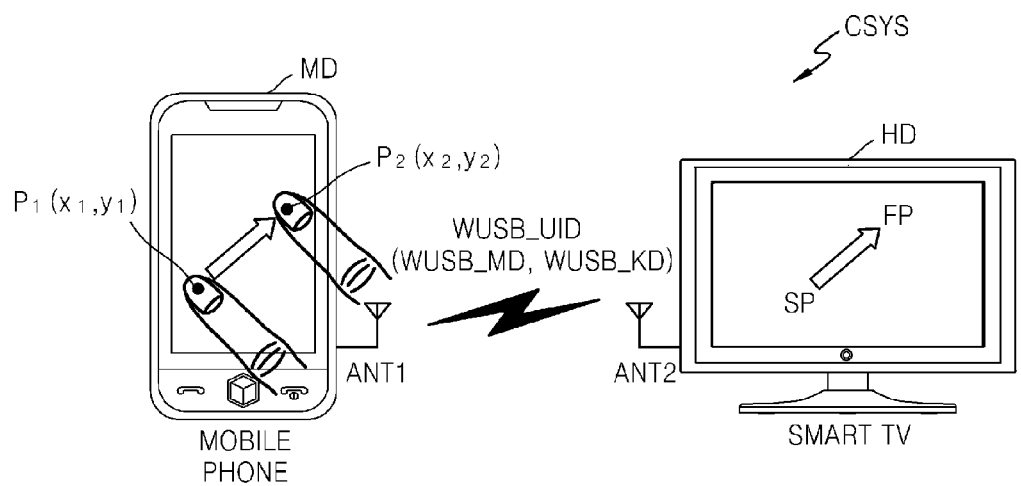
Figure 28A:
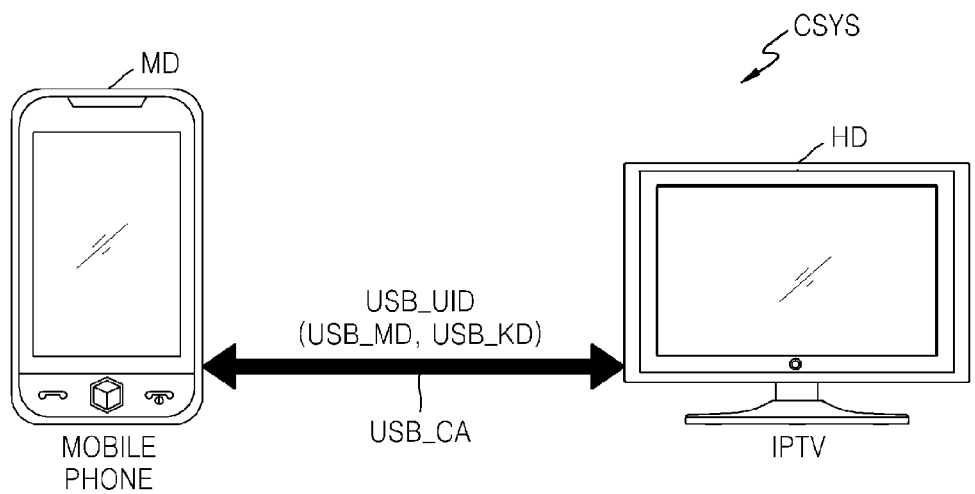
FIGS. 28A through 31B are diagrams illustrating various examples of the mobile device and the host device in the computational system of FIGS. 1A and 1B.
Figure 28B:
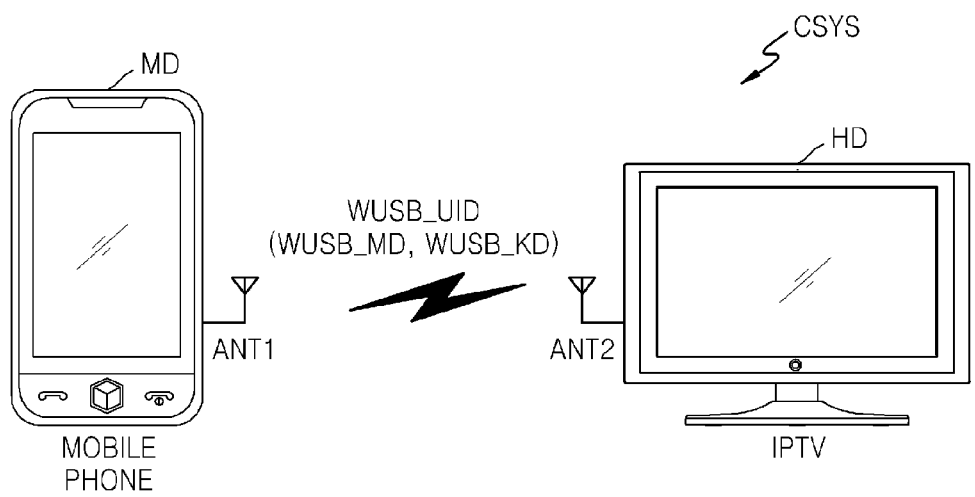

In the above, the case where the mobile device MD according to the inventive concept is a mobile phone and the host device may be a personal computer. However, the inventive concept is not limited thereto. Referring to FIG. 25, the host device HD according to an embodiment of the inventive concept may be a smart television. The USB UI data USB_UID generated in the mobile phone may be transmitted to the smart television by wired or wireless USB communication and may be processed as an input of the smart television. Each of FIGS. 26A, 26B, 27A, and 27B is a diagram illustrating input processing of the smart television according to a movement and a touch of the mobile device, in the case where the host device HD according to an embodiment of the inventive concept is the smart television. The structures and the operations of examples of FIGS. 26A, 26B, 27A, and 27B may be understood by referring to the description for FIG. 19 and the like. Furthermore, the host device HD according to an embodiment of the inventive concept, as illustrated in FIG. 28, may be an Internet protocol television (IPTV).

Figure 29A:
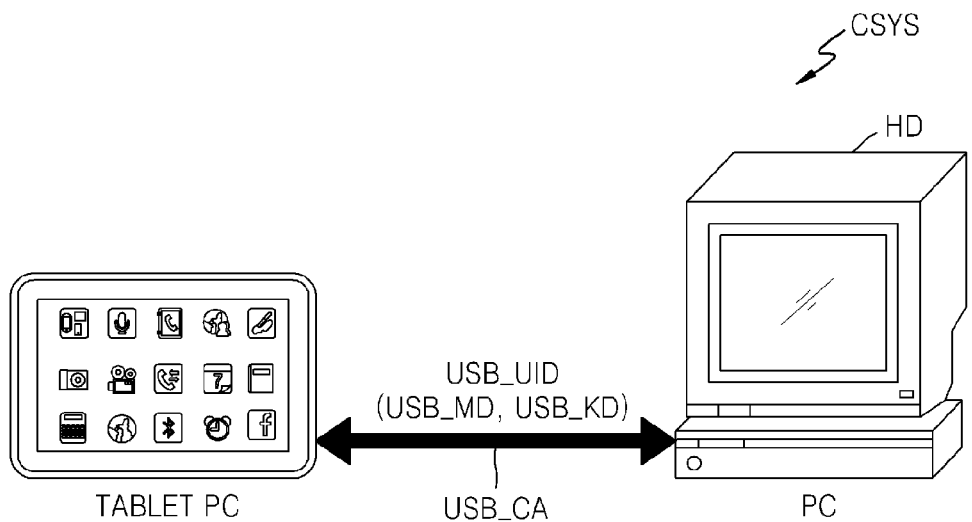
Figure 29B:
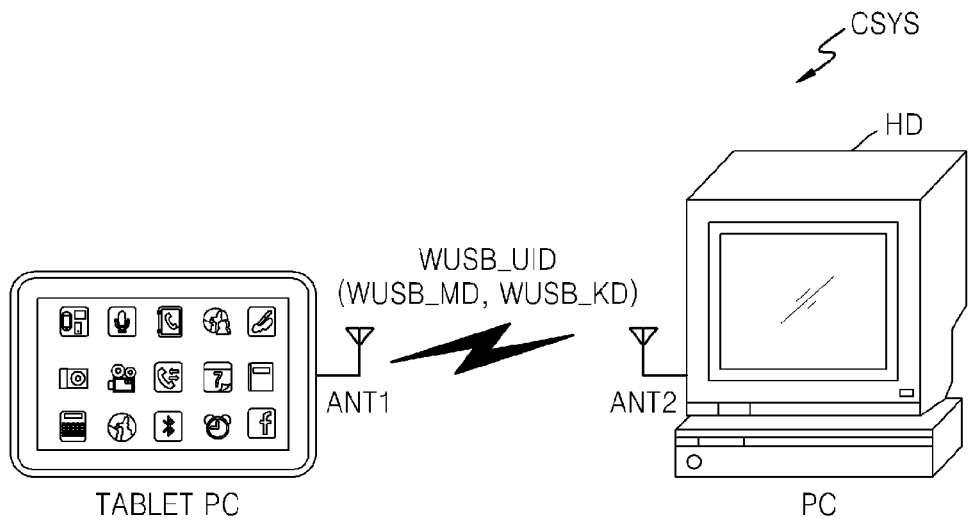
Figure 30:
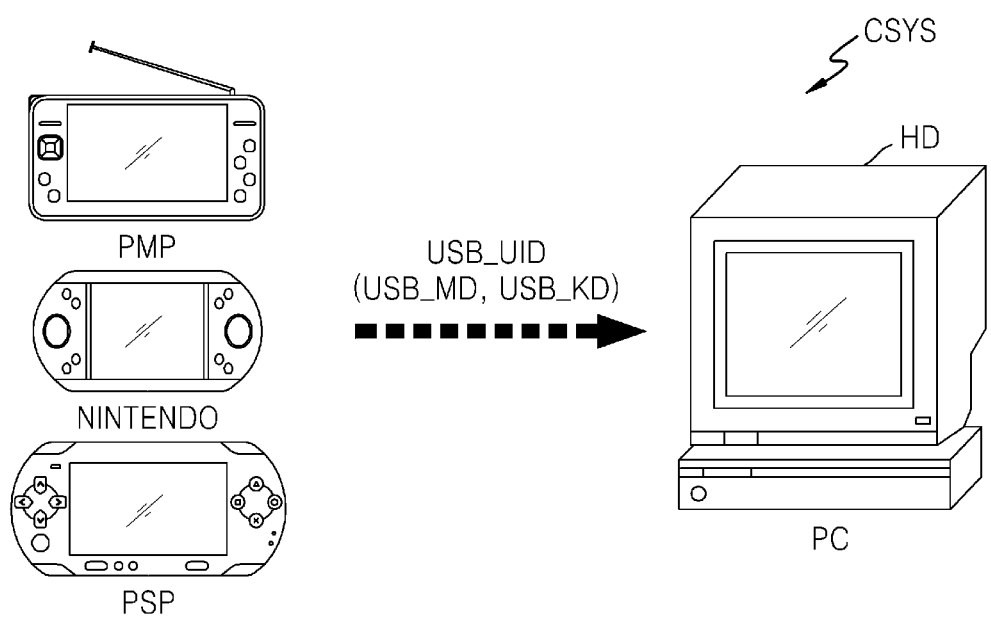

FIGS. 29A, 29B, and 30 are diagrams illustrating various examples of the mobile device MD in the computational system of FIGS. 1A and 1B Referring to FIGS. 29A and 29B, the mobile device MD according to an embodiment of the inventive concept may be a tablet personal computer (PC). Furthermore, referring to FIG. 30, the mobile device MD according to an embodiment of the inventive concept may be a portable multimedia player (PMP) or a mobile game console such as a Nintendo or PlayStation portable (PSP) game console.

Figure 31A:
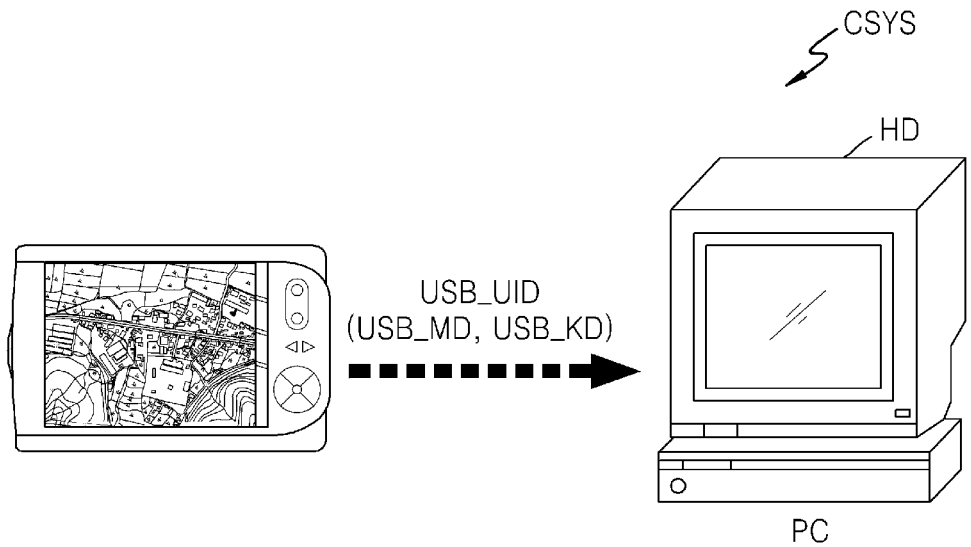
Figure 31B:
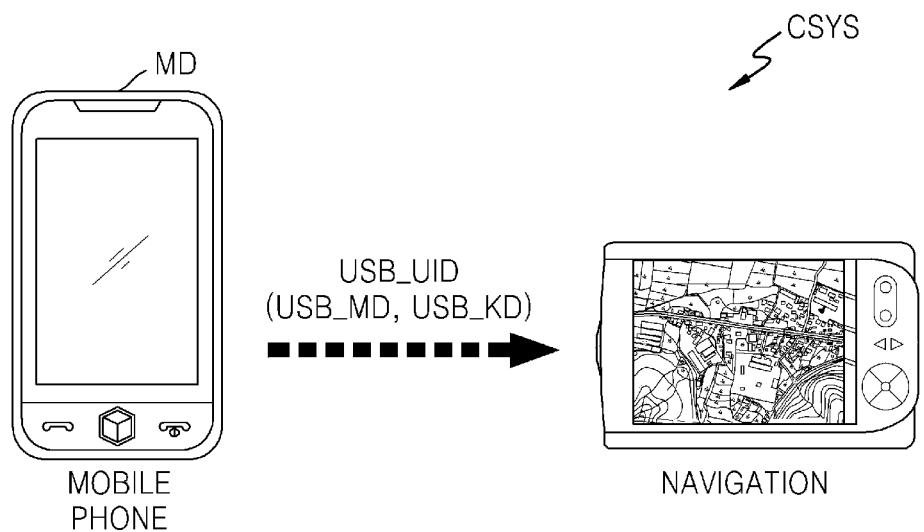

FIGS. 31A and 31B are diagrams illustrating other examples of the mobile device MD and the host device HD in the computational system of FIGS. 1A and 1B.

In the computational system CSYS of FIG. 31A, the mobile device MD may be a navigation system, and the host device HD may be a personal computer PC. Accordingly, in the computational system CSYS, an input to the personal computer PC may be performed by the navigation system. As in the computational system CSYS of FIG. 31B, the mobile device MD may be a mobile phone, and the host device HD may be a navigation system. In the case of FIG. 31B, the user may control the navigation system by a simple action such as just moving the mobile phone, with securing a view for driving while driving a vehicle. Therefore, by using the computational system CSYS according to an embodiment of the inventive concept, safety of the driver may be secured.

Figure 32A:
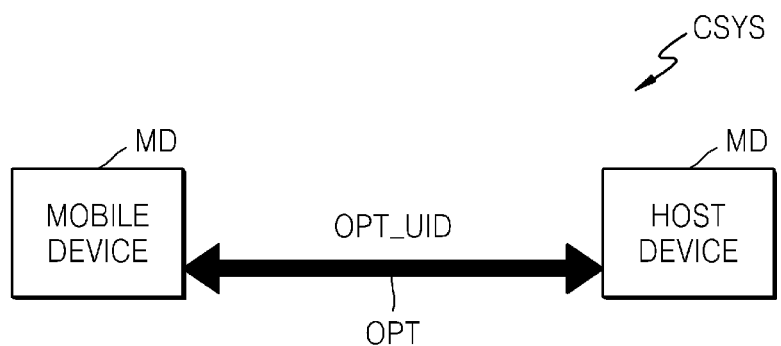
FIGS. 32A and 32B are block diagrams of a computational system according to another embodiment of the inventive concept.
Figure 32B:
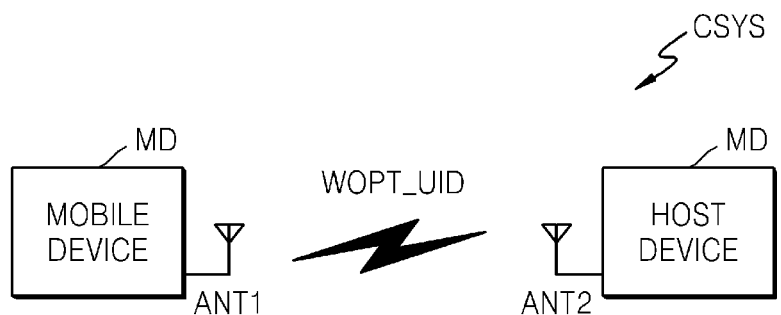
Figure 33:
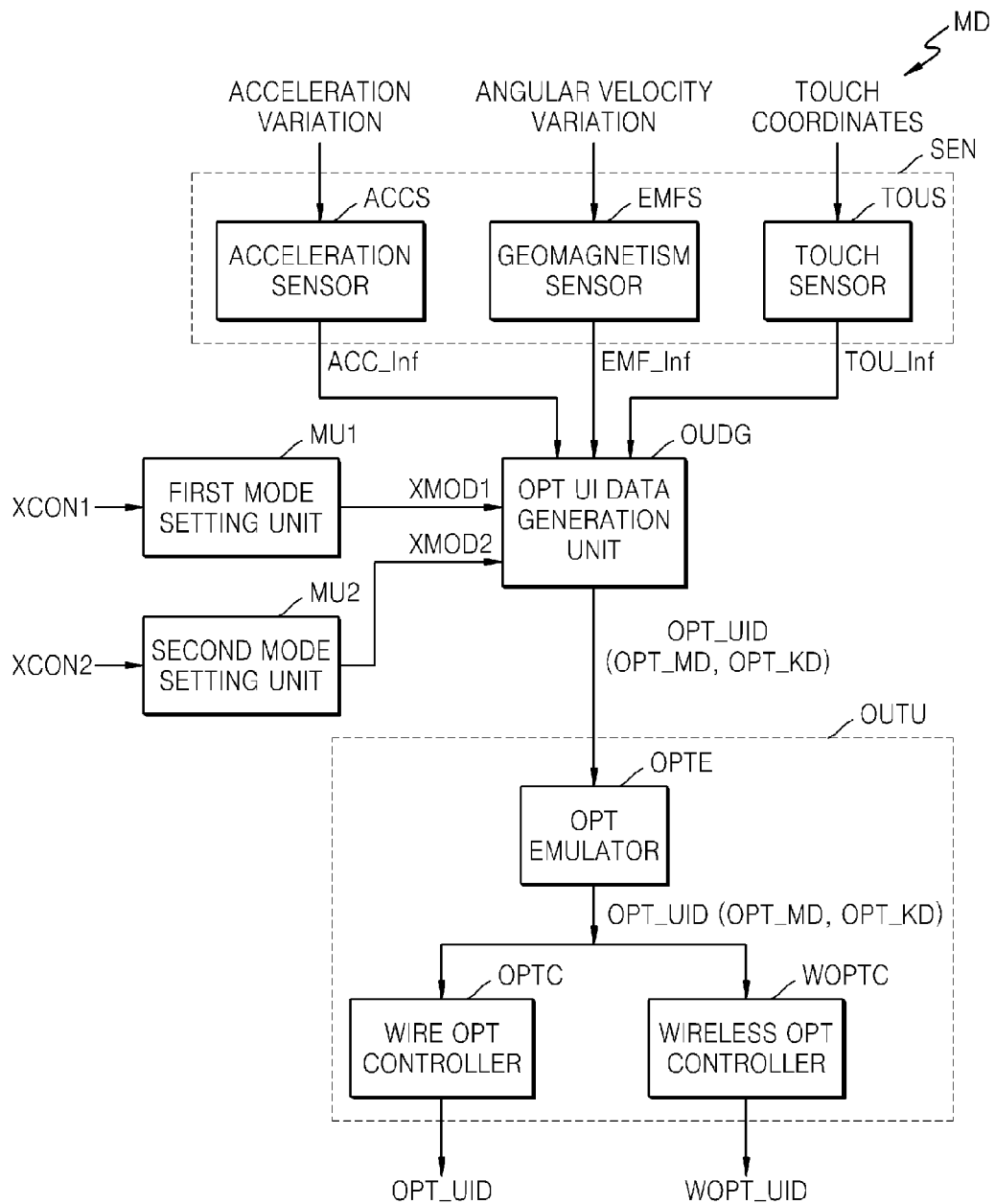
FIG. 33 is a block diagram of an example of a mobile device in FIGS. 32A and 32B in more detail.

FIGS. 32A and 32B are block diagrams of a computational system CSYS according to another embodiment of the inventive concept, and FIG. 33 is a more detailed block diagram of an example of a mobile device MD of the computational system CSYS of FIGS. 32A and 32B.

Referring to FIGS. 32A and 32B, a host device HD of the computational system CSYS may receive optical UI data OPTHID_DT which is transmitted from the mobile device MD through wired or wireless optical communication and corresponds to a variation of movement or touch coordinates of the mobile device MD, and may process the received optical UI data OPTHID_DT as a corresponding mouse event or keyboard event. Here, the mobile device MD of FIG. 33 may include an optical emulator OPTE, a wired optical controller OPTC, and a wireless optical controller WOPTC corresponding to the USB emulator USBE, the wired USB controller USBC, and the wireless USB controller WUSBC which are illustrated in FIG. 15A, respectively.

Figure 34:
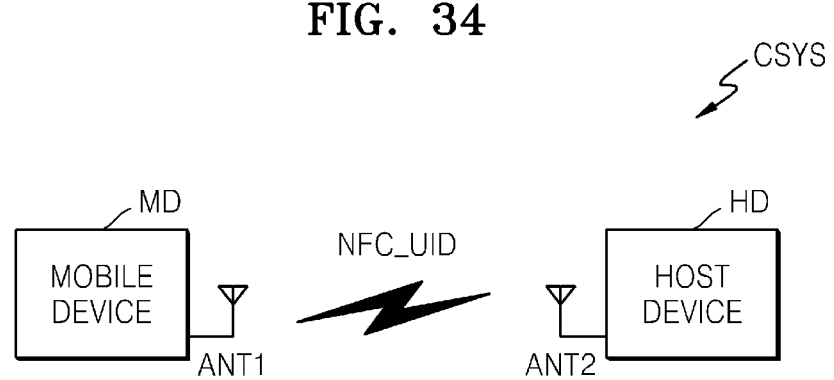
FIG. 34 is a block diagram of a computational system according to another embodiment of the inventive concept.
Figure 35:
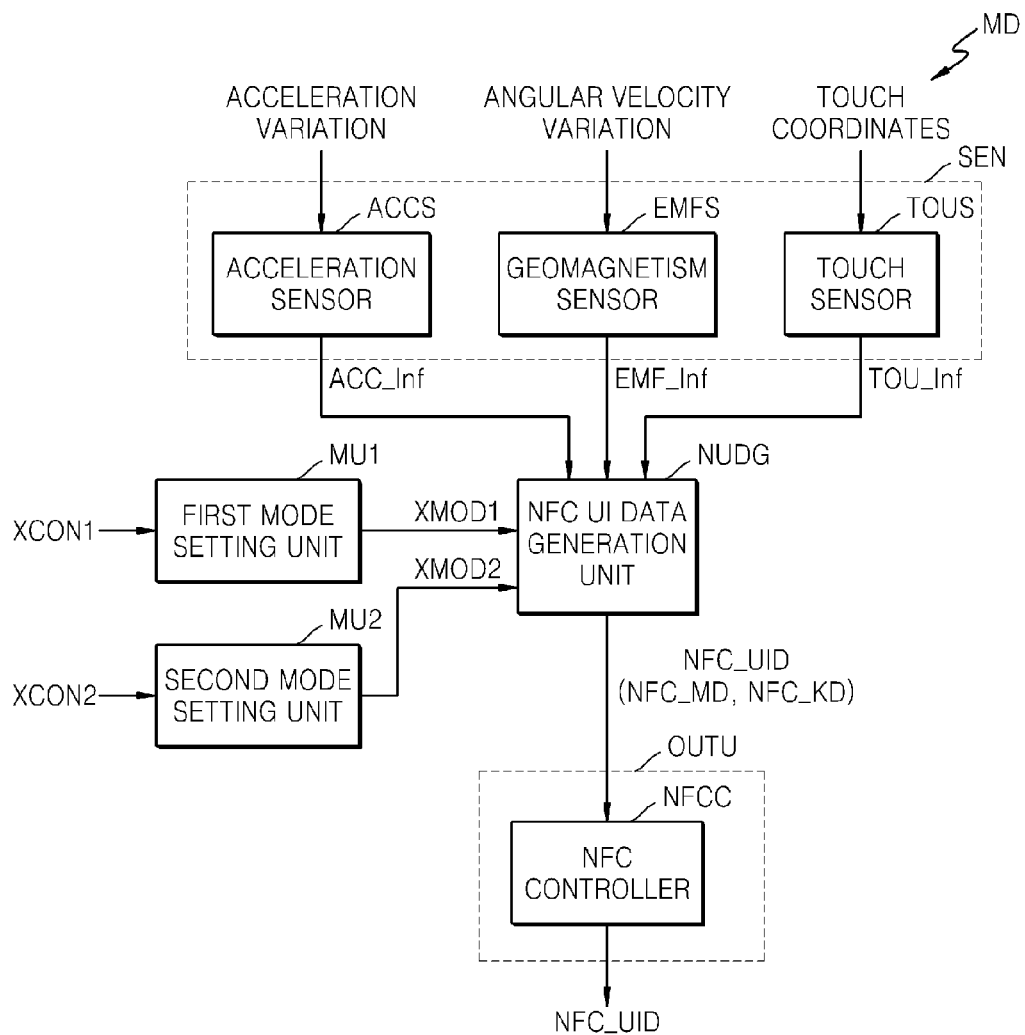
FIG. 35 is a block diagram of a mobile device of the computational system of FIG. 34 in more detail.

FIG. 34 is a block diagram of a computational system CSYS according to another embodiment of the inventive concept, and FIG. 35 is a more detailed block diagram of an example of a mobile device MD of the computational system CSYS of FIG. 34.

Referring to FIG. 34, a host device HD of the computational system CSYS according to an embodiment of the inventive concept may receive near field communication (NFC) UI data NFCHID_DT which is transmitted from the mobile device MD by using an NFC method and corresponds to a variation of movement or a touch coordinates of the mobile device MD, and may process the received NFC UI data NFCHID_DT as a corresponding mouse event or keyboard event. Here, the mobile device MD of FIG. 35 may include an NFC controller NFCC corresponding to the wireless USB controller WUSBC of FIG. 15A.

Figure 36:
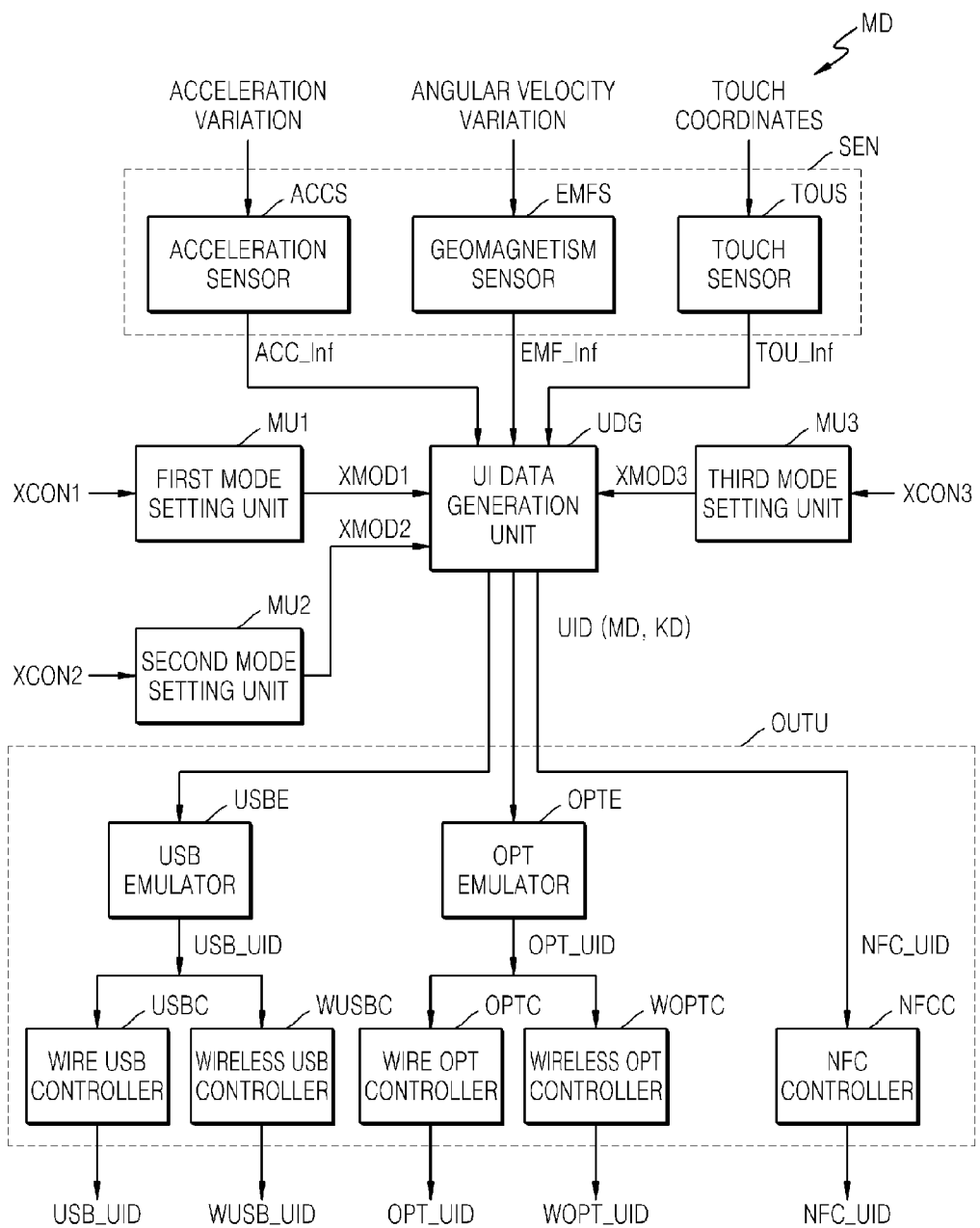
FIG. 36 is a block diagram of an example of a mobile device in another example of the computational system according to an embodiment of the inventive concept.

That is, the computational system according to an embodiment of the inventive concept may select one of various kinds of communication methods and transmit the aforementioned user interface data to the host device. As illustrated in FIG. 36, a UI data generation unit UDG may change sensing information into UI data UID by using one of a plurality of communication methods, in response to a third mode signal XMOD3. Here, the plurality of communication methods may include the USB communication, the optical communication, and the NFC communication.

The mobile device MD of FIG. 36 may further include a third mode setting unit MU3 for transmitting the third mode signal XMOD3 to the USB UI data generation unit UDG in response to the third control signal XCON3. Furthermore, an output unit OUTU may output the UI data UID by one of the plurality of communication methods. Accordingly, the output unit OUTU of FIG. 36 may include the USB emulator USBE, the wired USB controller USBC, the wireless USB controller WUSBC, the optical emulator OPTE, the wired optical controller OPTC, the wireless optical controller WOPTC, and the NFC controller NFCC.

FIGS. 37 through 41 are block diagrams of computational systems CSYS according to various embodiments of the inventive concept.

Figure 37:
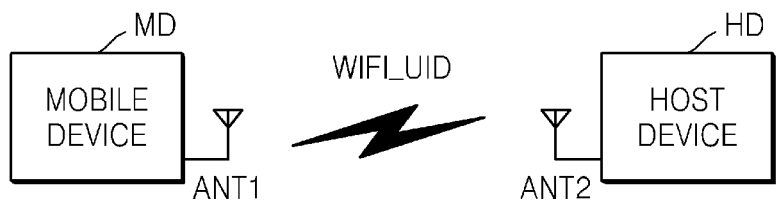
FIGS. 37 through 42B are block diagrams of computational systems according to other embodiments of the inventive concept.
Figure 38:
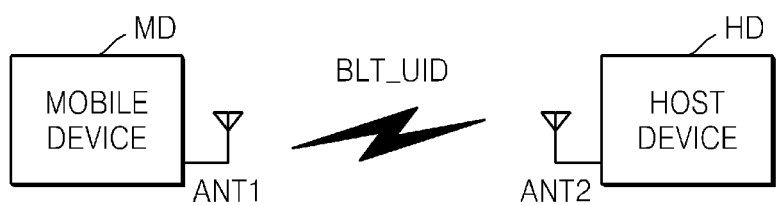
Figure 39:
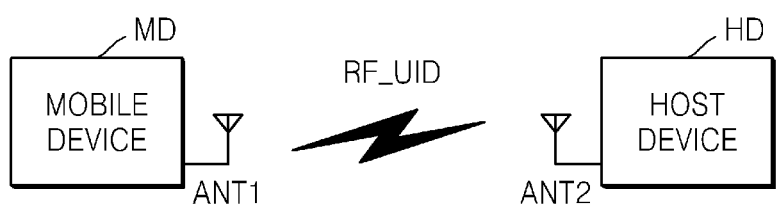
Figure 40:
Figure 41:

Referring to FIGS. 37 through 41, the computational systems CSYS according to the other embodiments of the inventive concept may transmit user interface data generated in the mobile device MD, as input data of the host device HD, to the host device HD by using various communication methods. That is, as shown in FIG. 37, wireless fidelity (WIFI) UI data WIFI_UID which is generated in the mobile device MD through WIFI communication, may be transmitted, as input data of the host device HD, to the host device HD, and, as shown in FIG. 38, Bluetooth UI data BLT_UID which is generated in the mobile device MD through Bluetooth communication, may be transmitted, as input data of the host device HD, to the host device HD. Furthermore, as shown in FIG. 39, radio frequency (RF) UI data RF_UID which is generated in the mobile device MD through RF communication, may be transmitted, as input data of the host device HD, to the host device HD, and, as shown in FIG. 40, worldwide interoperability for microwave access (WIMAX) UI data WIMAX_UID which is generated in the mobile device MD through WIMAX communication, may be transmitted, as input data of the host device HD, to the host device HD. Furthermore, in an ubiquitous environment, as shown in FIG. 41, Zigbee UI data ZIGBEE_UID which is generated in the mobile device MD through Zigbee communication, may be transmitted, as input data of the host device HD, to the host device HD.

Each of the computational systems CSYS illustrated in FIGS. 37 through 41 may have a structure corresponding to FIG. 33 or 34. For example, an output unit (not shown) of the mobile device MD in the computational system CSYS of FIG. 37 may include a controller corresponding to the NFC controller NFCC of FIG. 35. Furthermore, the computational system according to an embodiment of the inventive concept may select one of the communication methods of FIGS. 37 through 41, generate the UI data by a selected communication method, and transmit the UI data to the host device. In this case, as illustrated in FIG. 36, a third mode signal for selecting a communication method may be applied to the UI data generation unit. Furthermore, the computational system according to an embodiment of the inventive concept may select one of the USB communication, the optical communication, the NFC communication, and the communication methods described in reference to FIGS. 37 through 41, generate the UI data by a selected communication method, and transmit the UI data to the host device.

The inventive concept has been particularly shown and described with reference to exemplary embodiments thereof. Here, although the specific terms have been used to describe the inventive concept, these terms are for the purpose of describing the inventive concept only and are not intended to limit the meaning of the inventive concept or the scope of the inventive concept as defined by the following claims.

Figure 42A:
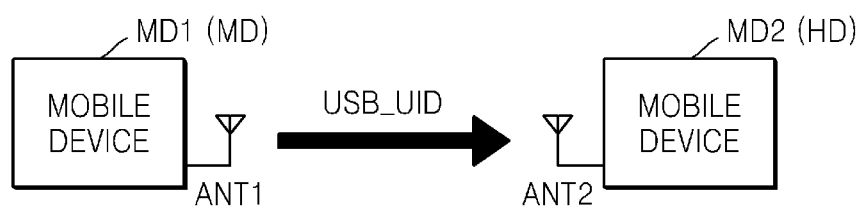
Figure 42B:

For example, as illustrated in FIGS. 42A and 42B, a host device HD of a computational system CSYS according to an embodiment of the inventive concept may be the mobile device MD according to an embodiment of the inventive concept. In detail, as shown in FIG. 42A, the first mobile device MD1 may transmit an event generated therein, that is, sensing information, as the USB user data USB_UID to the second mobile device MD2 which functions as the host device HD, and, as shown in FIG. 42B, the second mobile device MD2 may transmit an event generated therein, that is, sensing information, as the USB user data USB_UID to the first mobile device MD1 which functions as the host device HD. That is, through point-to-point communication between the mobile devices MD1 and MD2, the mobile devices MD1 and MD2 may operate as a human interface device (HID) to communicate with each other.

Therefore, it will be understood by those of ordinary skill in the art that various changes in form and details may be made therein without departing from the scope of the inventive concept as defined by the following claims.

What is claimed is:

1. A mobile device comprising:
a sensor unit including at least one of a motion sensor and a touch sensor, wherein the motion sensor is configured to generate motion information indicating motion variation of the mobile device, the touch sensor is configured to generate touch information indicating coordinates touched on a touch screen of the mobile device, and the sensor unit outputs at least one of the motion information and the touch information as sensing information;
a universal serial bus user interface (USB UI) data generation unit configured to receive the sensing information and change the sensing information into USB UI data; and
a USB controller configured to receive the USB UI data and output the USB UI data to an external host device via a USB communication technique,
wherein the USB UI data is USB mouse data or USB keyboard data;
wherein the USB mouse data includes a changed mouse button value, a changed mouse first coordinate value and a changed mouse second coordinate value; and
wherein the USB keyboard data includes a changed direction key value and a changed key buffering value.

2. The mobile device of claim 1, wherein the USB communication technique is a wired USB communication technique or a wireless USB communication technique.

3. The mobile device of claim 2, wherein the motion sensor includes at least one of an acceleration sensor that generates acceleration information indicating acceleration variation and a geomagnetism sensor that generates angular velocity information indicating angular velocity variation.

4. The mobile device of claim 3, wherein the acceleration information includes information indicating acceleration variation in a first axis direction, a second axis direction and a third axis direction for the mobile device, and the angular velocity information includes information indicating angular velocity variation in the first axis direction, the second axis direction, and the third axis direction of the mobile device.

5. A mobile device comprising:
a sensor unit including at least one of a motion sensor and a touch sensor, wherein the motion sensor is configured to generate motion information indicating motion variation of the mobile device, the touch sensor is configured to generate touch information indicating coordinates touched on a touch screen of the mobile device, and the sensor unit outputs at least one of the motion information and the touch information as sensing information;
a universal serial bus user interface (USB UI) data generation unit configured to receive the sensing information and change the sensing information into USB UI data; and
a USB controller configured to receive the USB UI data and output the USB UI data to an external host device via a USB communication technique;
wherein the USB communication technique is a wired USB communication technique or a wireless USB communication technique, and
wherein the sensor unit is configured to receive a first mode signal and generate one of the motion information and the touch information as the sensing information in response to the first mode signal.

6. A mobile device comprising:
a sensor unit including at least one of a motion sensor and a touch sensor, wherein the motion sensor is configured to generate motion information indicating motion variation of the mobile device, the touch sensor is configured to generate touch information indicating coordinates touched on a touch screen of the mobile device, and the sensor unit outputs at least one of the motion information and the touch information as sensing information;
a universal serial bus user interface (USB UI) data generation unit configured to receive the sensing information and change the sensing information into USB UI data; and
a USB controller configured to receive the USB UI data and output the USB UI data to an external host device via a USB communication technique;
wherein the USB communication technique is a wired USB communication technique or a wireless USB communication technique, and
wherein the sensor unit further includes a sensor control unit that automatically activates the motion sensor or the touch sensor in response to a variation in the mobile device during a power saving mode.

7. The mobile device of claim 6, wherein the mobile device is a mobile phone, a tablet personal computer, a portable multimedia player (PMP), a mobile game, or a navigation system.

8. A mobile device comprising:
a sensor unit including at least one of a motion sensor and a touch sensor, wherein the motion sensor is configured to generate motion information indicating motion variation of the mobile device, the touch sensor is configured to generate touch information indicating coordinates touched on a touch screen of the mobile device, and the sensor unit outputs at least one of the motion information and the touch information as sensing information;
a universal serial bus user interface (USB UI) data generation unit configured to receive the sensing information and change the sensing information into USB UI data; and
a USB controller configured to receive the USB UI data and output the USB UI data to an external host device via a USB communication technique
wherein the USB communication technique is a wired USB communication technique or a wireless USB communication technique, and
wherein the USB UI data generation unit is configured to receive the motion information and the touch information as the sensing information, the USB UI data generation unit receives a first mode signal and changes one of the motion information and the touch information into the USB UI data in response to the first mode signal.

* * * * *